US012641092B2

(12) United States Patent
Humphrey et al.

(10) Patent No.: US 12,641,092 B2
(45) Date of Patent: May 26, 2026

(54) METHOD FOR DETERMINING LIKELY MALICIOUS BEHAVIOR BASED ON ABNORMAL BEHAVIOR PATTERN COMPARISON

(71) Applicant: Darktrace Holdings Limited, Cambridge (GB)

(72) Inventors: Dickon Murray Humphrey, Cambridge (GB); Timothy Owen Bazalgette, Knebworth (GB); Stephen Casey, Cambridge (GB); Jack Benjamin Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 3 days.

(21) Appl. No.: 17/859,862

(22) Filed: Jul. 7, 2022

(65) Prior Publication Data

US 2023/0012220 A1 Jan. 12, 2023

Related U.S. Application Data

(60) Provisional application No. 63/219,026, filed on Jul. 7, 2021.

(51) Int. Cl.
| | |
|---|---|
| *G06F 21/57* | (2013.01) |
| *G06F 11/3604* | (2025.01) |
| *G06F 21/53* | (2013.01) |
| *H04L 9/40* | (2022.01) |
| *H04L 41/16* | (2022.01) |

(52) U.S. Cl.
CPC ...... *H04L 63/1416* (2013.01); *G06F 11/3604* (2013.01); *G06F 21/53* (2013.01); *G06F*

*21/577* (2013.01); *H04L 41/16* (2013.01); *H04L 63/1425* (2013.01); *H04L 63/1433* (2013.01);

(Continued)

(58) Field of Classification Search
None
See application file for complete search history.

(56) References Cited

U.S. PATENT DOCUMENTS

| | | | |
|---|---|---|---|
| 10,268,821 | B2 | 4/2019 | Stockdale |
| 10,419,466 | B2 | 9/2019 | Ferguson |

(Continued)

FOREIGN PATENT DOCUMENTS

| | | | | |
|---|---|---|---|---|
| CN | 109040130 | B | * 12/2020 | ......... H04L 63/1416 |

*Primary Examiner* — Fatoumata Traore
(74) *Attorney, Agent, or Firm* — Rutan and Tucker, LLP

(57) ABSTRACT

A method for a cyber threat defense system is provided. The method comprises receiving a first abnormal behavior pattern where the first abnormal behavior pattern represents behavior on a first network deviating from a normal benign behavior of that network; and receiving a second abnormal behavior pattern where the second abnormal behavior pattern representing either behavior on the first network or on a second network deviating from a normal benign behavior of that network. The method further comprises comparing the first and second abnormal behavior patterns to determine a similarity score between the first and second abnormal behavior patterns and determining, based on the comparison, that the first abnormal behavior pattern likely corresponds to malicious behavior when the similarity score is above a threshold. A corresponding non-transitory computer readable medium is also provided.

20 Claims, 18 Drawing Sheets

(52) U.S. Cl.
CPC .... H04L 63/1441 (2013.01); *G06F 2221/034*
(2013.01)

(56) References Cited

U.S. PATENT DOCUMENTS

| | | | |
|---|---|---|---|
| 10,701,093 | B2 | 6/2020 | Dean |
| 10,728,263 | B1 * | 7/2020 | Neumann ........... H04L 63/1416 |
| 2017/0149813 | A1 * | 5/2017 | Wright ................ H04L 63/1416 |
| 2017/0250997 | A1 * | 8/2017 | Rostamabadi ...... H04L 63/1416 |
| 2018/0063170 | A1 * | 3/2018 | Truvé .................. H04L 63/1425 |
| 2019/0260804 | A1 * | 8/2019 | Beck ....................... H04L 41/22 |
| 2020/0244673 | A1 | 7/2020 | Stockdale |
| 2021/0273958 | A1 | 9/2021 | McLean |

* cited by examiner

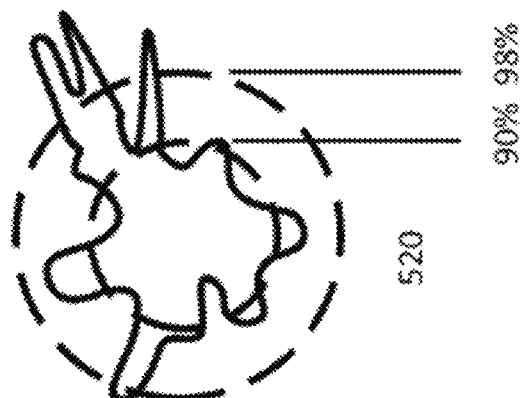
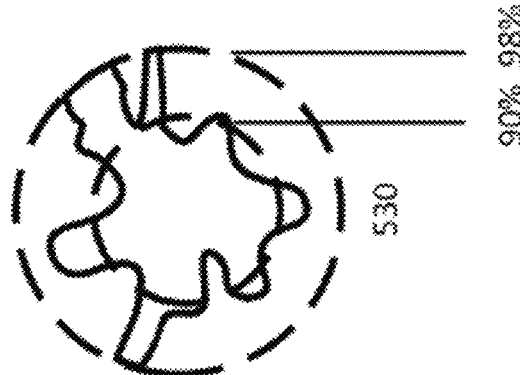
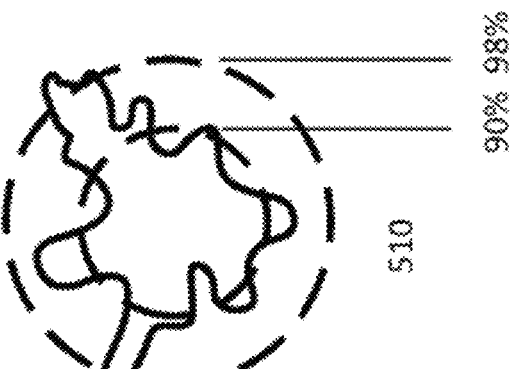
Fig. 5

Start

| Receive Input Data From Entity Probe | 802 |

| Analyze Input Data Using Model | 804 |

| Generate First Abnormal Behavior Pattern | 806 |

| Collect Second Abnormal Behavior Pattern | 808 |

| Identify Entity in Breach State | 810 |

| Generate Inoculation Record Describing Breach | 812 |

| Store Inoculation Record | 814 |

End

| Confidence Score 902 | Severity Score 904 | Consequence Score 906 |
|---|---|---|

Fig. 9

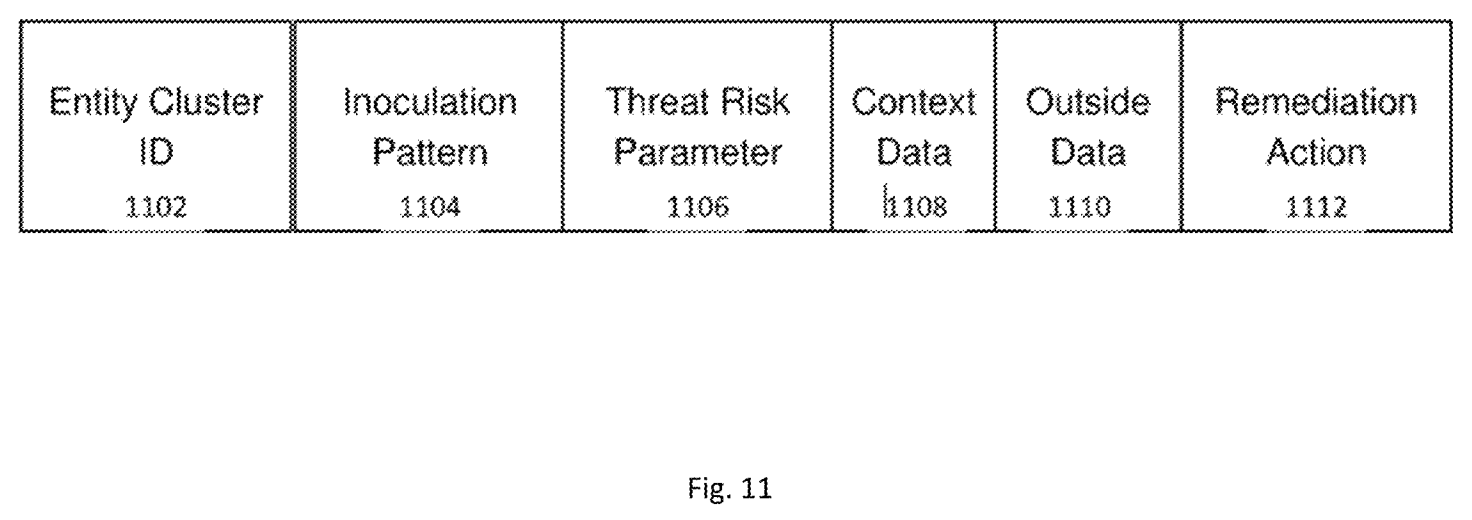

| Entity Cluster ID 1102 | Inoculation Pattern 1104 | Threat Risk Parameter 1106 | Context Data 1108 | Outside Data 1110 | Remediation Action 1112 |
|---|---|---|---|---|---|

Fig. 11

Start

| Generate Inoculation Pattern | 1202 |

| Associate An Entity Cluster Description | 1204 |

| Anonymize Inoculation Data for Primary Entity | 1206 |

| Associate Context Data With Inoculation Data | 1208 |

| Associate Outside Data With Inoculation Data | 1210 |

| Generate Remediation Action | 1212 |

| Associate Remediation Action With Inoculation Data | 1214 |

| Update Inoculation Data | 1216 |

Fig. 12          End

| Confidence Benchmark 1402 | Severity Benchmark 1404 | Consequence Benchmark 1406 |
|---|---|---|
| Confidence Weight 1408 | Severity Weight 1410 | Consequence Weight 1412 |

Fig. 14

Start

Generate Benchmark Matrix                                            1502

Populate Benchmark Scores                                           1504

Assign Weights To Each Benchmark Score                             1506

Generate Threat Risk Parameter                                     1508

Populate Threat Risk Parameter With Scores                         1510

Compare Threat Risk Parameter To Benchmark Matrix   1512

End

Start

Generate Inoculation Report Listing Inoculation Record 1602

Select Ancillary Device Based on Entity Cluster 1604

Send Inoculation Report To Ancillary Device 1606

Receive Inoculation Request From Ancillary Device 1608

Provide Inoculation Record To Ancillary Device 1610

End

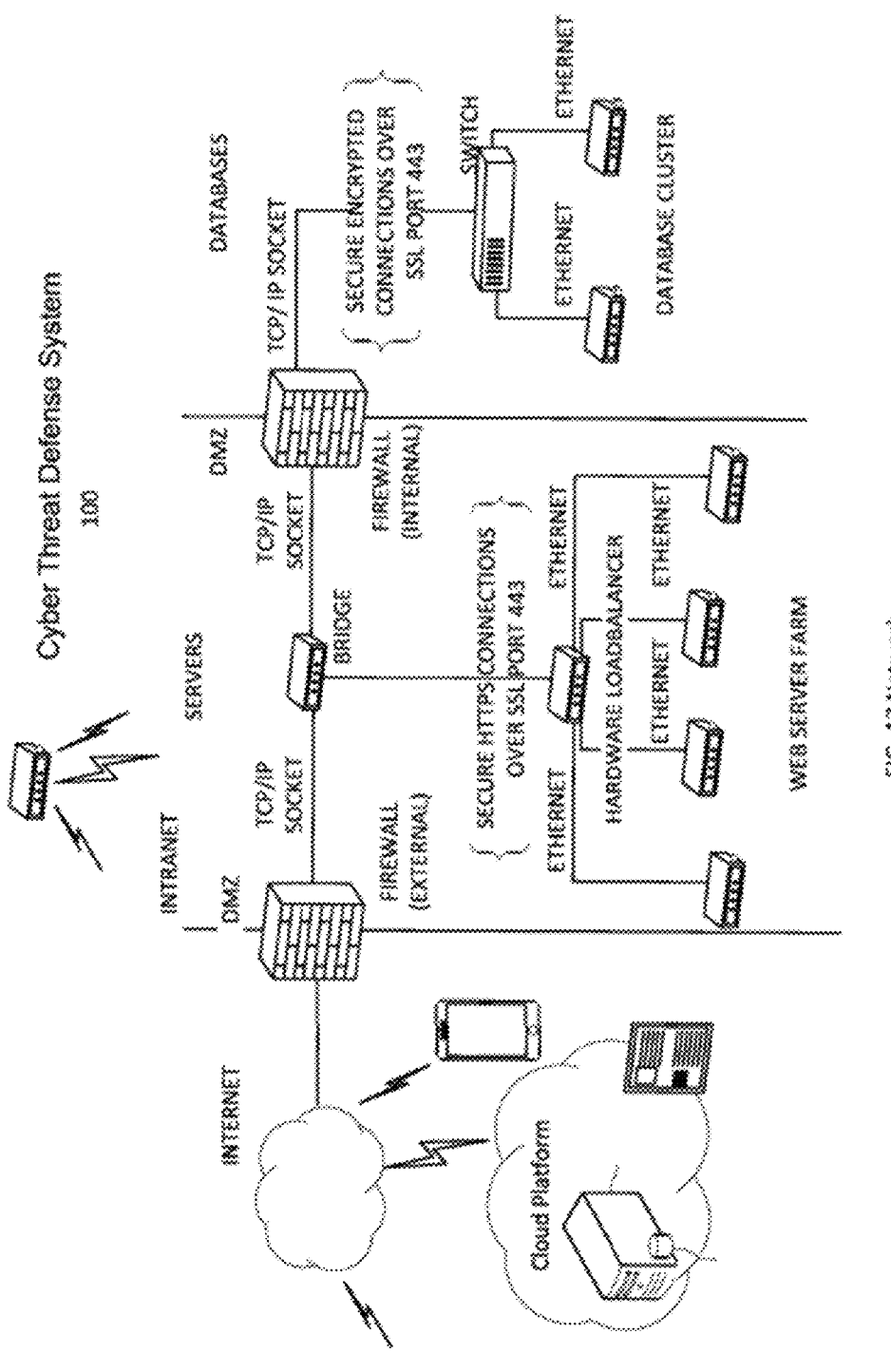
FIG. 17 Network

METHOD FOR DETERMINING LIKELY MALICIOUS BEHAVIOR BASED ON ABNORMAL BEHAVIOR PATTERN COMPARISON

RELATED APPLICATION

This application claims priority under 35 USC 119 to U.S. provisional patent application 63/219,026, titled "A CYBER THREAT DEFENSE SYSTEM AND OTHER SECURITY TOOLS" filed Jul. 7, 2021, which the disclosures of such are incorporated herein by reference in their entirety.

NOTICE OF COPYRIGHT

FIELD

Embodiments of the design provided herein generally relate to a cyber threat defense system. In an embodiment, a cyber threat defense system may compare abnormal behavior patterns to determine that an abnormal behavior pattern likely corresponds to malicious behavior.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

Cyber threat, including email threats, viruses, trojan horses, and worms, can subtly and rapidly cause harm to a network. Additionally, human users may wreak further damage to the system by malicious action. A cyber security system has to identify each of these cyber threats as they evolve. Furthermore, it is advantageous to be able to identify previously unseen malicious behavior before it can cause harm or damage to a network or system.

SUMMARY

Methods, systems, and apparatus are disclosed for an Artificial Intelligence based cyber threat defense system.

A cyber threat defense system can receive a first abnormal behavior pattern and a second abnormal behavior pattern. The first abnormal behavior pattern can represent behavior on a first network deviating from a normal benign behavior of that network. The second abnormal behavior pattern can represent either behavior on the first network or on a second network deviating from a normal benign behavior of that network. The first and second abnormal behavior patterns can be compared to determine a similarity score between the first and second abnormal behavior patterns, and it can be determined, based on the comparison, that the first abnormal behavior pattern likely corresponds to malicious behavior when the similarity score is above a threshold.

In one aspect, receiving the first abnormal behavior pattern may comprise comparing input data monitoring the first network to at least one machine-learning model trained on a normal benign behavior of the first network using a normal behavior benchmark describing parameters corresponding to a normal pattern of activity of the first network to determine that a network behavior of the first network deviates from the normal benign behavior of the first network; analyzing the network behavior of the first network to extract first metadata that describes how the network behavior of the first network deviates from the normal benign behavior of the first network; and generating the first abnormal behavior pattern using the first metadata.

Optionally, the first abnormal behavior pattern is generated by encoding the first metadata into a single value, a vector or a matrix. In this manner, the system can determine whether a network is exhibiting some abnormal behavior and generate a representative abnormal behavior pattern for that behavior using extracted metadata, allowing the pattern to be compared to other abnormal behavior patterns for similarity.

In another aspect, when the second abnormal behavior pattern represents behavior on the first network deviating from a normal benign behavior of that network, receiving the second abnormal behavior pattern may comprise comparing input data monitoring the first network to at least one machine-learning model trained on a normal benign behavior of the first network using a normal behavior benchmark describing parameters corresponding to a normal pattern of activity of the first network to determine that a network behavior of the first network deviates from the normal benign behavior of the first network; analyzing the network behavior of the first network to extract second metadata that describes how the network behavior of the first network deviates from the normal benign behavior of the first network; and generating the second abnormal behavior pattern using the second metadata. The second abnormal behavior pattern may be generated by encoding the second metadata into a single value, a vector or a matrix.

Alternatively, when the second abnormal behavior pattern represents behavior on the second network deviating from a normal benign behavior of that network, receiving the second abnormal behavior pattern comprises comparing input data monitoring the second network to at least one machine-learning model trained on a normal benign behavior of the second network using a normal behavior benchmark describing parameters corresponding to a normal pattern of activity of the second network to determine that a network behavior of the second network deviates from the normal benign behavior of the second network; analyzing the network behavior of the second network to extract second metadata that describes how the network behavior of the second network deviates from the normal benign behavior of the second network; and generating the second abnormal behavior pattern using the second metadata. The second abnormal behavior pattern may be generated by encoding the second metadata into a single value, a vector or a matrix.

Accordingly, it can be seen that the cyber threat defense system can generate the second abnormal behavior pattern in a similar or the same way as the first abnormal behavior pattern, advantageously allowing a good comparison of the two abnormal behavior patterns, regardless of whether the first and second abnormal behavior patterns correspond to behavior on the same network or different networks.

In another aspect, receiving the second abnormal behavior pattern may comprise selecting one abnormal behavior pattern from a plurality of stored abnormal behavior patterns as the second abnormal behavior pattern. The method can be repeated comparing the first abnormal behavior pattern against each of the stored abnormal behavior patterns. In some cases, the method is repeated either until the first abnormal behavior pattern is found to have a similarity score above the threshold when compared with one of the stored abnormal behavior patterns or until the first abnormal behavior pattern is compared against each of the stored abnormal behavior patterns. If multiple similarity scores above the threshold are determined when comparing the first abnormal behavior pattern to two or more stored behavior patterns, the most similar abnormal behavior pattern can be identified, for example, as the abnormal behavior pattern having the highest similarity score to the first abnormal behavior pattern.

In some aspects, the first abnormal behavior pattern is not known to correspond to malicious behavior and the second abnormal behavior pattern corresponds to behavior of a known specific threat actor. In this aspect, the second abnormal behavior pattern can include an encoding of metadata that enables the comparison with the first abnormal behavior pattern to identify that the first abnormal behavior corresponds to the specific threat actor but that does not necessarily identify a specific attack.

In this manner, rather than specific attacks being identified based on a series of parameters or hallmarks, behavior can be linked to a specific threat actor. This can enable novel attacks to be identified before they can cause harm by identifying the behavior as being that of a hostile actor, potentially even before any harmful activity has been carried out.

According to this aspect, receiving the second abnormal behavior pattern may comprise providing known compromise instances from the specific threat actor to a neural network to determine the second abnormal behavior pattern corresponding to behavior of that specific threat actor. By analyzing past attacks known (or strongly suspected) to have been carried out by a specific threat actor, a behavior pattern that enables that specific threat actor to be identified can be constructed.

Also according to this aspect, the method further comprises, if the similarity score between the first and second abnormal behavior patterns is above the threshold, updating, by the neural network, the second abnormal behavior pattern based on the first abnormal behavior pattern being determined behavior of the specific threat actor. This enables the second abnormal behavior pattern, corresponding to the specific threat actor, to be updated over time to ensure that it remains up to date and reflective of the behavior of the specific threat actor.

Alternatively, in another aspect, neither the first abnormal behavior pattern or the second abnormal behavior pattern are known to correspond to malicious behavior. In this case, the first abnormal behavior pattern and the second abnormal behavior pattern have been compared to known patterns of malicious behavior and found not to match the known patterns of malicious behavior.

In this manner, however, the matching of repeating patterns of similar anomalous behavior is an indicator of potentially malicious behavior. Comparing, and preferably collecting, anomalous behavior patterns enables new threats and threat actors to be detected, potentially even before the anomalous behavior has caused harm.

According to another aspect, when it is determined that the first abnormal behavior pattern likely corresponds to malicious behavior, an inoculation notice having an inoculation pattern describing the first abnormal behavior pattern can be sent to a target device to warn of a potential cyber threat. In this aspect, a remediation action may be determined in response to the potential cyber threat, and the inoculation notice comprises the remediation action.

Sending an inoculation notice, and determining and providing a remediation action, in this manner can help to ensure that other networks and network entities protected by the cyber threat defense system can make use of the information gathered through the comparison of the anomalous behavior patterns. This sharing of information in an inoculation notice further improves the security provided by the cyber threat defense system.

In another aspect, when it is determined that the first abnormal behavior pattern likely corresponds to malicious behavior, a description of the first abnormal behavior pattern can be presented to a user analyst for review. This can allow a variety of analyzes to be performed, including determining the effect or purpose of the anomalous behavior and determining whether it is malicious and whether it corresponds to a cyber threat.

According to another aspect, a cyber threat defense system is provided. The cyber threat defense system comprises a comparison module configured to receive a first abnormal behavior pattern, the first abnormal behavior pattern representing behavior on a first network deviating from a normal benign behavior of that network; receive a second abnormal behavior pattern, the second abnormal behavior pattern representing either behavior on the first network or on a second network deviating from a normal benign behavior of that network; and compare the first and second abnormal behavior patterns to determine a similarity score between the first and second abnormal behavior patterns. The cyber threat defense system further comprises a cyber threat module configured to determine, based on the comparison, that the first abnormal behavior pattern likely corresponds to malicious behavior when the similarity score is above a threshold.

According to another aspect, a non-transitory computer readable medium is provided including executable instructions that, when executed with one or more processors, cause a cyber threat defense system to perform the method of any preceding aspect.

These and other features of the design provided herein can be better understood with reference to the drawings, description, and claims, all of which form the disclosure of this patent application.

DRAWINGS

The drawings refer to some embodiments of the design provided herein in which:

FIG. 5 illustrates an application of a cyber threat defense system using advanced machine-learning to detect anomalous behavior.

FIG. 9 illustrates a block diagram of a threat risk parameter.

FIG. 11 illustrates a block diagram of an inoculation record.

FIG. 14 illustrates a block diagram of a benchmark matrix.

FIG. 17 illustrates an example network to be protected by the cyber threat defense system.

Figure 1:
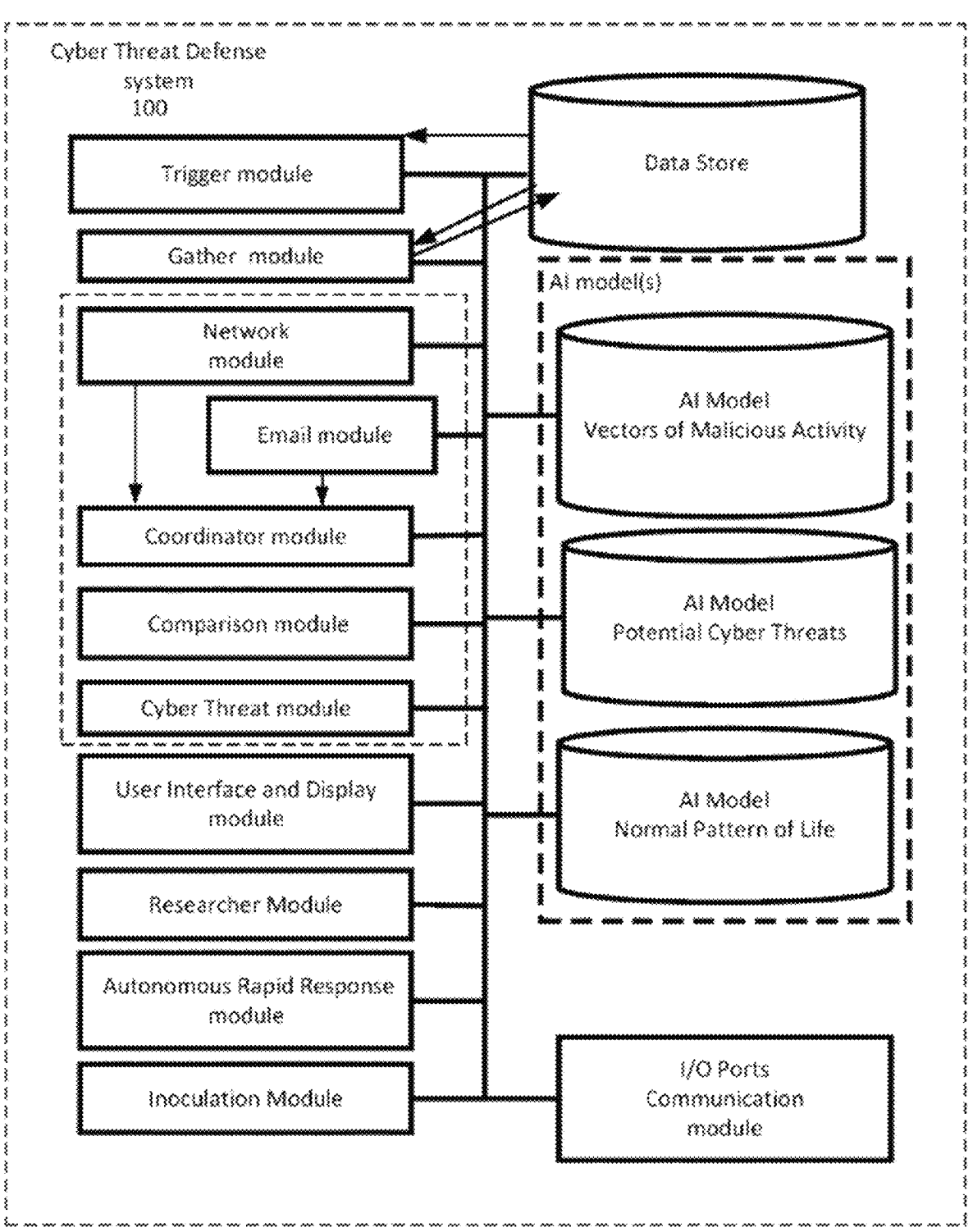
FIG. 1 illustrates a block diagram of an embodiment of a cyber threat defense system with a cyber threat module that references machine-learning models that are trained on the normal behavior of a network entity to identify cyber threats by identifying deviations from normal behavior.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats. FIG. 1 illustrates a block diagram of an embodiment of a cyber threat defense system with a cyber threat module that references machine-learning models that are trained on the normal behavior of network activity and user activity associated with a network. The cyber threat module determines a threat risk parameter that factors in 'what is a likelihood of a chain of one or more unusual behaviors of email activity, network activity, and user activity under analysis that fall outside of being a normal benign behavior;' and thus, are likely malicious behavior.

The cyber threat defense system 100 may protect against cyber security threats from an e-mail system or other communication system, as well as its network. The cyber threat defense system 100 may include components such as i) a trigger module, ii) a gather module, iii) a data store, iv) a network module, v) an email module, vi) a coordinator module, vii) a comparison module, viii) a cyber threat module, ix) a user interface module, x) a researcher module, xi) an autonomous response module, xii) an inoculation module, xiii) a communication module, xiv) at least one input or output (I/O) port to securely connect to other ports as required, xv) one or more machine-learning models such as a first Artificial Intelligence model trained on characteristics of vectors for malicious activity and related data, a second Artificial Intelligence model trained on potential cyber threats and/or threat actors, and one or more Artificial Intelligence models each trained on different users, devices, system activities and interactions between entities in the system, and other aspects of the system, as well as xiv) other similar components in the cyber threat defense system.

A trigger module may detect time stamped data indicating one or more i) events and/or ii) alerts from I) unusual or II) suspicious behavior/activity are occurring and then triggers that something unusual is happening. Accordingly, a gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the email module monitoring email activity, the network module monitoring network activity, the comparison module to apply one or more models trained on different aspects of this process, and the cyber threat module to identify cyber threats and/or threat actors based on comparisons by the comparison module. While an email module is mentioned, a similar module may be applied to other communication systems, such as text messaging and other possible vectors for malicious activity. Each hypothesis of typical threats and/or threat actors can have various supporting points of data and other metrics associated with that possible threat and/or threat actor, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data.

The cyber threat module may also use one or more machine-learning models trained on cyber threats and/or threat actors in the network. The cyber threat module may reference the models that are trained on the normal behavior of email activity and user activity associated with the network. The cyber threat module can reference these various trained machine-learning models and data from the network module, the email module, and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, may be malicious behavior.

The one or more machine-learning models can be self-learning models using unsupervised learning and trained on a normal behavior of different aspects of the system. For example, these aspects may include email activity and user activity associated with an email system, network activity and user activity associated with the network, and other aspects. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the input data via one or more ports from one or more probes. The at least one machine-learning model is trained on a generic normal benign behavior of a generic network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber threat defense system 100 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber threat module can also reference the machine-learning models trained on a transmission and related data to determine if a transmission or a series of transmissions under analysis have potentially malicious characteristics. The cyber threat module can also factor this transmission characteristics analysis into its determination of the threat risk parameter. The cyber threat module can generate a set of incident data describing an anomalous event by an entity, here representing a user, a device participating in the network or a number of devices or users on a network behaving in the same anomalous manner. The cyber threat module can use the incident data to determine whether the anomalous event indicates a breach state representing a malicious incident or confidential data exposure. To do this, the cyber threat module can use the user interface module to present the incident data to a user analyst for review. The user interface module is configured to present a description of the breach state to a user analyst. If the user analyst determines that the description of the breach state describes a cyber threat, the user analyst can instruct the user interface module to create an inoculation notice based on the observed breach state to be transmitted to all subscribed devices. If the user analyst determines that the description of the breach state matches the behavior of a threat actor, the user analyst can instruct the user interface module that the breach state is a behavior pattern of the threat actor. This information may be included in the inoculation notice. If the user analyst determines that the description of the breach state does not describe a cyber threat, the user interface module will not transmit an inoculation notice to other subscribed devices.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to at least one of a cyber threat and a threat actor.

The cyber threat defense system 100 may use multiple machine-learning models. Each machine-learning model may be trained on specific aspects of the normal pattern of life for the system such as devices, users, network traffic flow, outputs from one or more cyber security analysis tools analyzing the system, and others. One or more machine-learning models may also be trained on characteristics and aspects of all manner of types of cyber threats. One or more machine-learning models may also be trained by observing vectors for delivery of malware, such as network activity or emails themselves.

The email module monitoring email activity and the network module monitoring network activity may both feed their data to a coordinator module to correlate causal links between these activities to supply this input into the cyber threat module.

The cyber threat module can also factor this network activity link to a particular email causal link analysis into its determination of the threat risk parameter. The cyber threat defense system 100 uses various probes to collect the user activity, such as network activity and email activity, and then feed that activity to the data store, as well as the cyber threat module and the machine-learning models. The cyber threat module uses the collected data to draw an understanding of the email activity and user activity in the network as well as updates a training for the one or more machine-learning models trained on this network and its users. For example, email traffic can be collected by putting hooks into the e-mail application, such as Outlook or Gmail, and/or monitoring the internet gateway from which the e-mails are routed through. Additionally, probes may collect network data and metrics via one of the following methods: port spanning the organizations existing network equipment; inserting or re-using an in-line network tap, and/or accessing any existing repositories of network data.

The cyber threat defense system 100 may supplement the data provided to the users and cyber professionals using a researcher module. The researcher module operates an artificial intelligence (AI) algorithm to assess whether the anomalous network activity has previously appeared in other published threat research or known lists of malicious files or internet addresses. The researcher module can consult internal threat databases or external public sources of threat data that contain information relating to known threats and/or known threat actors, such as patterns of behavior indicative of the known threat and/or known threat actor. The researcher module can collect an outside data set describing at least one of an action or a state related to the cyber threat present outside of the network from at least one data source outside the network.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The cyber threat defense system 100 may have an inoculation module to communicate with other target devices both inside and outside the network. The inoculation module may use incident data describing a breach state by a user or device, acting as a network entity, to warn other computing devices of potential cyber threats. The inoculation module is configured to generate an inoculation pattern describing the breach state and the chain of relevant behavioral parameters corresponding to the cyber threat identified by the cyber threat module, using the identified cyber threat and/or threat actor as a template for developing an inoculation pattern. The inoculation module can anonymize the inoculation pattern to remove any personally identifiable information for the network entity from the inoculation pattern.

The inoculation module is configured to generate an inoculation notice having the inoculation pattern to warn a target device of a potential breach state of normal behavior corresponding to that cyber threat by the target device. The inoculation module is configured to use the communication module to send the inoculation notice to a device, referred to here as a target device, on a network protected by an affiliated cyber threat defense system via at least one output port.

The communication module can broadcast the inoculation notice to every device on the network. Alternately, the communication module can select a target device for notification of inoculation using clustering to identify commonalties between a network entity and other devices on the network. The inoculation module is configured to create an entity cluster to group the network entity with other entities of the network based on the chain of relevant behavior parameters of the inoculation pattern. The communication module is configured to select a target device for notification regarding the inoculation pattern based on the entity cluster.

The inoculation module can generate an inoculation record to store the inoculation pattern. The inoculation module can store the inoculation record in a network-accessible inoculation database in the data store. The inoculation module can generate a remediation action instruction to describe at least one action to remediate the breach state. If the cybersecurity appliance possesses an autonomous response module, a user analyst can enter a remediation action instruction using the user interface module. Alternately, if the cybersecurity appliance possesses an autonomous response module, the inoculation module can automatically generate the remediation action instruction based on a similar cyber threat. If the cybersecurity appliance does not possess an autonomous response module, the remediation action can be made as a passive recommendation. The inoculation record can associate the inoculation pattern with a context data set describing at least one of a network entity action and a network entity state related to the cyber threat identified by the cyber threat module. The inoculation record associates the inoculation pattern with an outside data set collected from at least one data source outside the network describing at least one of an outside action and an outside state related to the cyber threat. The inoculation module is configured to update the inoculation pattern in the inoculation record based on a subsequent event that conforms with the inoculation pattern.

The inoculation module can generate an inoculation report listing any inoculation records stored in a network-accessible inoculation database at the data store. The inoculation module can send the inoculation report via at least one output port to a target device to instruct the target device to retrieve an inoculation record from the network-accessible inoculation database. The target device may retrieve the inoculation record from the network-accessible inoculation database via at least one input port. As with the inoculation notice, the communication module can broadcast the inoculation report to every device on the network. Alternately, the communication module can select a target device for an inoculation report using clustering to identify commonalities between a network entity and other devices on the network.

The cyber threat module can generate a threat risk parameter listing a set of values describing aspects of the breach state. The cyber threat module can populate the threat risk parameter with a confidence score, a severity score, and a consequence score. The confidence score indicates a threat likelihood describing a probability that the breach state is a cyber threat. The severity score indicates a percentage that the network entity in the breach state is deviating from the at least one model. The consequence score indicates a severity of damage attributable to the cyber threat.

The inoculation module can generate a benchmark matrix having a set of benchmark scores to determine whether to send the inoculation notice. The inoculation module may adjust the benchmark scores based on the collected data for the network entity. The inoculation module may assign a weight to each benchmark score to assign a relative importance to each benchmark score. The inoculation module may compare the threat risk parameter to a benchmark matrix having a set of benchmark scores to determine whether to send an inoculation notice.

The cyber threat defense system 100 may be hosted on a device, on one or more servers, or in its own cyber threat appliance platform.

Figure 2:
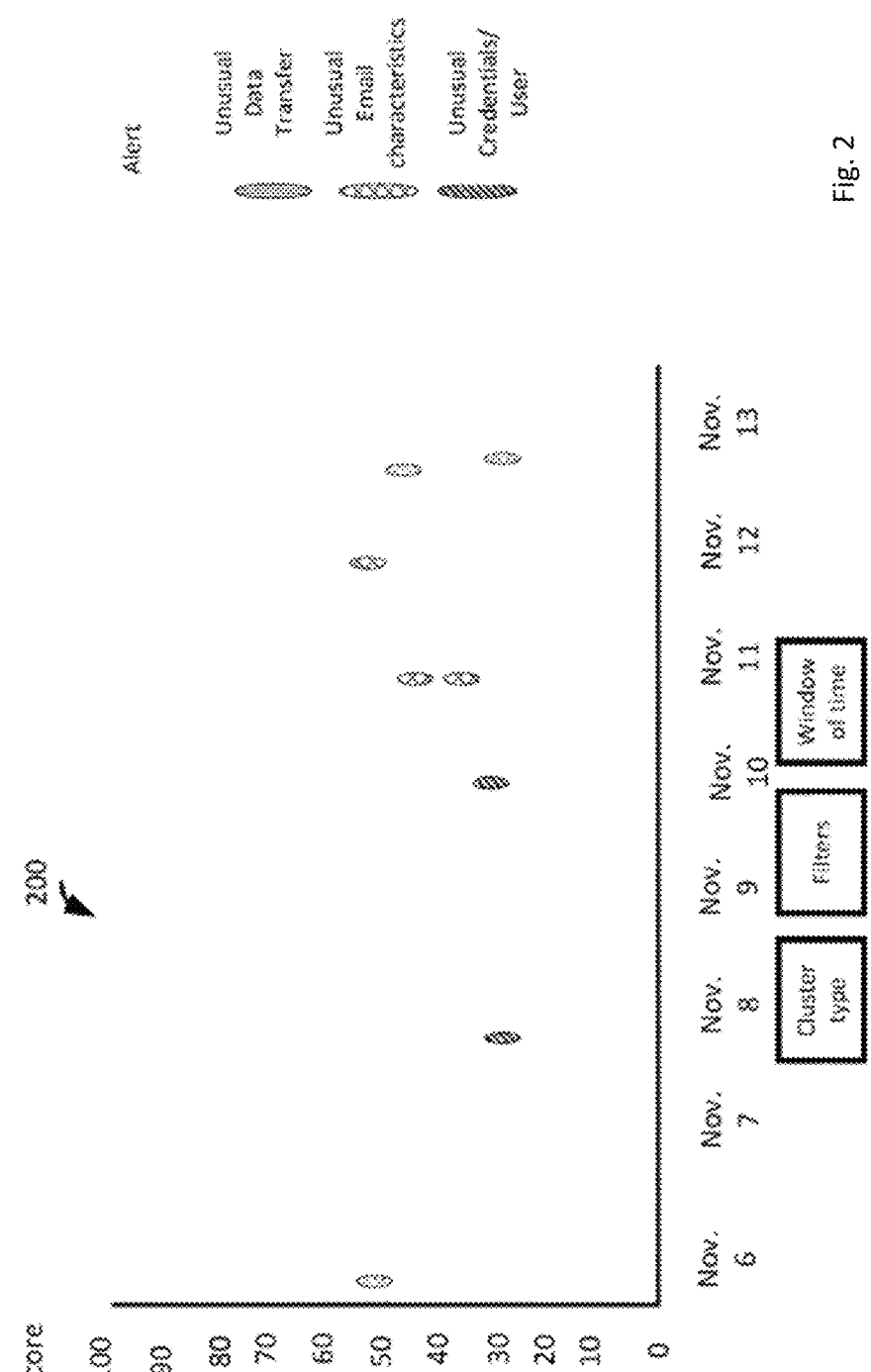
FIG. 2 illustrates a block diagram of an embodiment of an example chain of unusual behavior for the email(s) in connection with the rest of the network under analysis.

FIG. 2 illustrates a block diagram of an embodiment of an example chain of unusual behavior for the email(s) in connection with the rest of the network under analysis.

The user interface can display a graph 200 of an example chain of unusual behavior for the email(s) in connection with the rest of the network under analysis.

The network & email module can tie the alerts and events from the email realm to the alerts and events from the network realm.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network entity, such as a network, a system, a device, a user, or an email, under analysis by the cyber threat module and the machine-learning models. The cyber defense system uses unusual behavior deviating from the normal behavior and then builds a chain of unusual behavior and the causal links between the chain of unusual behavior to detect cyber threats and/or threat actors. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a characteristic behavior of a malicious threat actor, such as a human or group of malicious actors. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in network actions in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of automatic response actions, if any, the defense system may take when for different types of cyber threats that are equal to or above a configurable level of threat posed by this malicious actor.

The cyber threat module may chain the individual alerts and events that form the unusual pattern into a distinct abnormal behavior pattern for the device, user, and/or network behavior for cyber threat analysis of that chain of distinct alerts or events. The cyber threat module may reference the one or more machine-learning models trained on e-mail threats to identify similar characteristics from the individual alerts or events forming the distinct item made up of the chain of alerts or events forming the unusual pattern.

One or more machine-learning models may also be trained on characteristics and aspects of all manner of types of cyber threats to analyze the threat risk associated with the abnormal behavior pattern. The machine-learning technology, using advanced mathematics, can detect previously unidentified threats, by detecting the presence of a threat actor or a number of similar, abnormal behavior patterns, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber threat module including the network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, and network activity in the system being protected by the cyber threat defense system.

As discussed, each machine-learning model may be trained on specific aspects of the normal pattern of life for the system such as devices, users, network traffic flow, outputs from one or more cyber security analysis tools analyzing the system, email contact associations for each user, email characteristics, and others. The one or more machine-learning models may use at least unsupervised learning algorithms to establish what is the normal pattern of life for the system. The machine-learning models can train on both i) the historical normal distribution of alerts and events for that system and ii) a normal distribution information from similar peer systems to establish the normal pattern of life of the behavior of alerts or events for that system. Another set of machine-learning models train on characteristics of emails and the activities and behavior of its email users to establish a normal for these.

The models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine-learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'normal behavior' to support or refute each possible hypothesis of what could be happening with this chain of unusual behavior under analysis.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine-learning models, that distinct chain of alerts or events can be determined to now have a much higher threat risk than any of the individual and/or events in the chain.

In addition, modern cyber-attacks can be of such severity and speed that a human response cannot happen quickly enough. Thanks to these self-learning advances, a machine may uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine-learning constantly revisits assumptions about behavior, using probabilistic mathematics. The cyber threat defense system's unsupervised machine-learning methods do not require training data with pre-defined labels. Instead, unsupervised machine-learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events that are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Defense System

Figure 3:
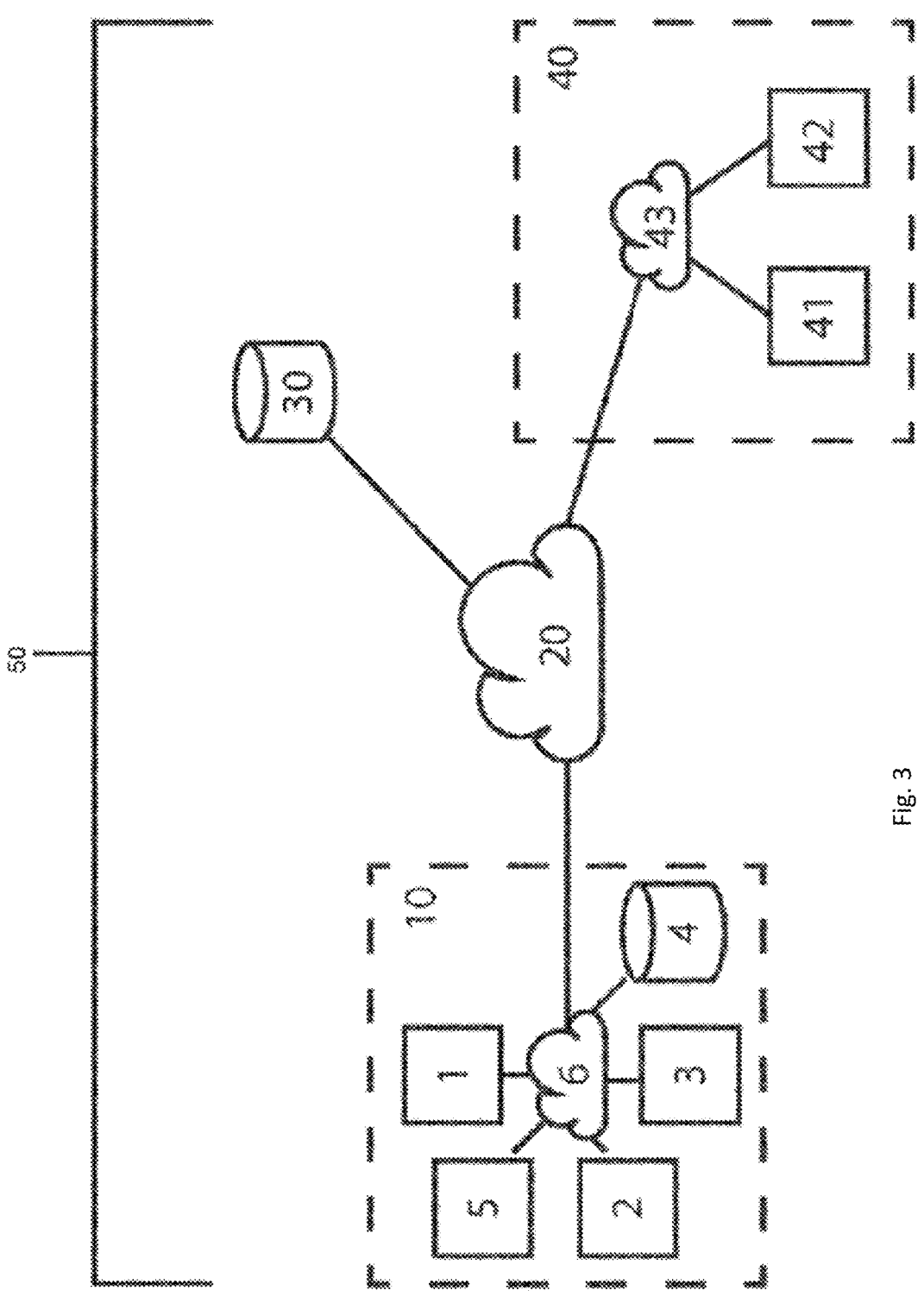
FIG. 3 illustrates an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the threat detection system installed on the computer 1.

Figure 4:
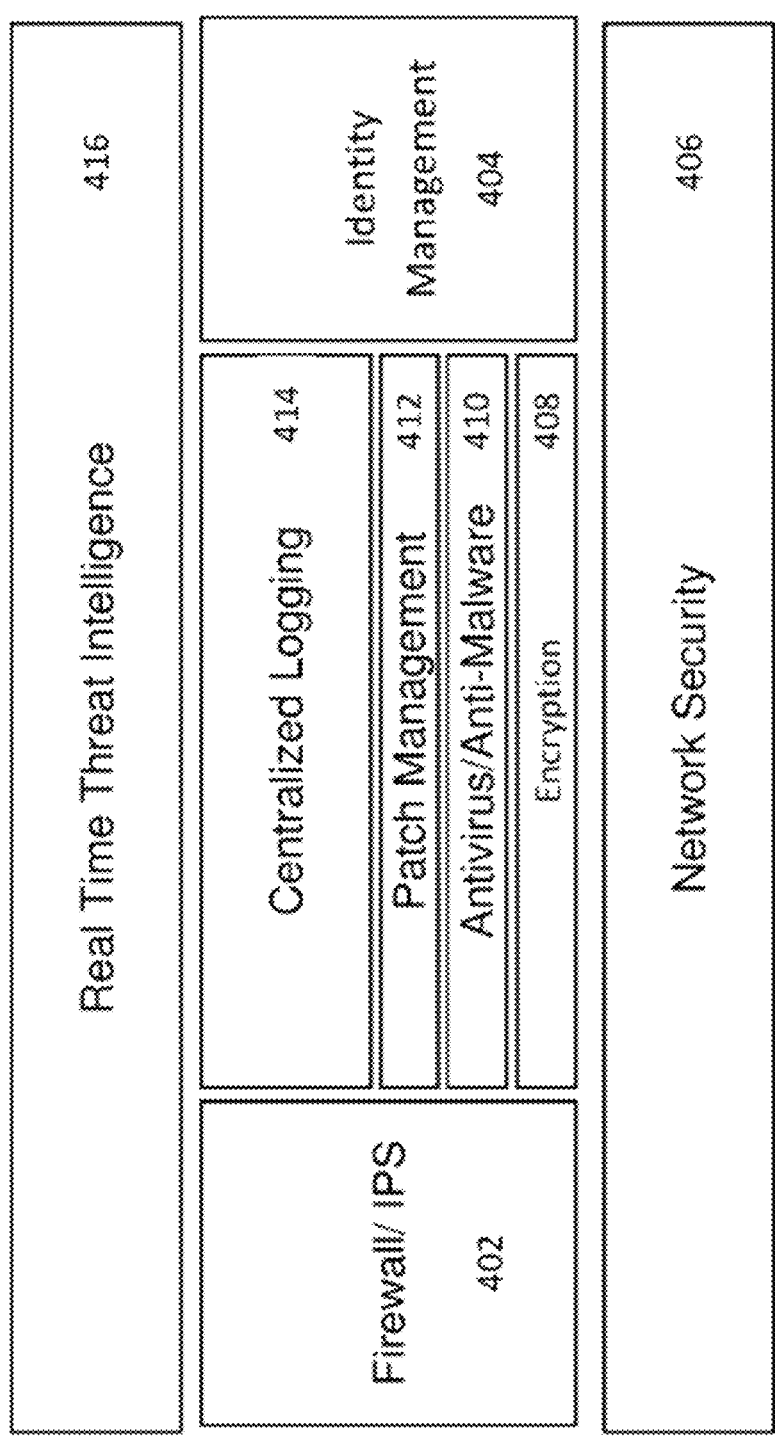
FIG. 4 illustrates in a block diagram the integration of the threat detection system with other network protections.

FIG. 4 illustrates in a block diagram the integration of the threat detection system with other network protections. A network generally has a firewall 402 as a first line of defense. The firewall 402 analyzes packet headers on incoming network data packets to enforce network policy. The firewall 402 may be integrated with an intrusion prevention system (IPS) to analyze the packet header and payload for whole events. Internally, an identity management module 404 controls the access for the users of the network.

A network security module 406 can enforce practices and policies for the network as determined by a network administrator. An encryption module 408 can encrypt communications within the network, as well as encrypting and decrypting communications between network entities and outside entities. An anti-virus or anti-malware module 410 may search packets for known viruses and malware. A patch management module 412 can ensure that security applications within the network have applied the most up-to-date patches. A centralized logging module 414 may track communications both internal to and interactive with the network. The threat detection system can act as real time threat intelligence 416 for the network. The real time threat intelligence may interact with the other defense components to protect the network.

The cyber defense self-learning platform uses machine-learning technology. The machine-learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'— that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine-learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches. For example, the machine-learning learns what is normal within a network without depending upon knowledge of previous attacks. The machine-learning thrives on the scale, complexity, and diversity of modern businesses, where every device and person is slightly different. The machine-learning turns the innovation of attackers against them, so that any unusual activity is visible. The machine-learning constantly revisits assumptions about behavior, using probabilistic mathematics. The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

FIG. 5 illustrates an application of a cyber threat defense system using advanced machine-learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

Machine-learning can approximate some human capabilities to machines. Machine-learning can approximate thought by using past information and insights to form judgments. Machine-learning can act in real time so that the system processes information as it goes. Machine-learning can self-improve by constantly challenging and adapting the model's machine-learning understanding based on new information.

New unsupervised machine-learning therefore allows computers to recognize evolving threats, without prior warning or supervision.

Unsupervised Machine-Learning

Unsupervised learning works things out without pre-defined labels. This allows the system to handle the unexpected and embrace uncertainty. The system does not always know the characteristics of the target of the search but can independently classify data and detect compelling patterns.

The cyber threat defense system's unsupervised machine-learning methods do not require training data with pre-defined labels. Instead, unsupervised machine-learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine-learning on cyber security is transformative. Threats from within, which would otherwise go undetected, can be spotted, highlighted, contextually prioritized, and isolated using these algorithms. The application of machine-learning has the potential to provide total network visibility and far greater detection levels, ensuring that networks have an internal defense mechanism. Machine-learning has the capability to learn when to execute automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

The inoculation module may also use clustering to identify which devices to send an inoculation notice. The inoculation module may select devices that have similar characteristics relevant to the anomalous event.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many interrelated features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. They continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine-learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Figure 6A:
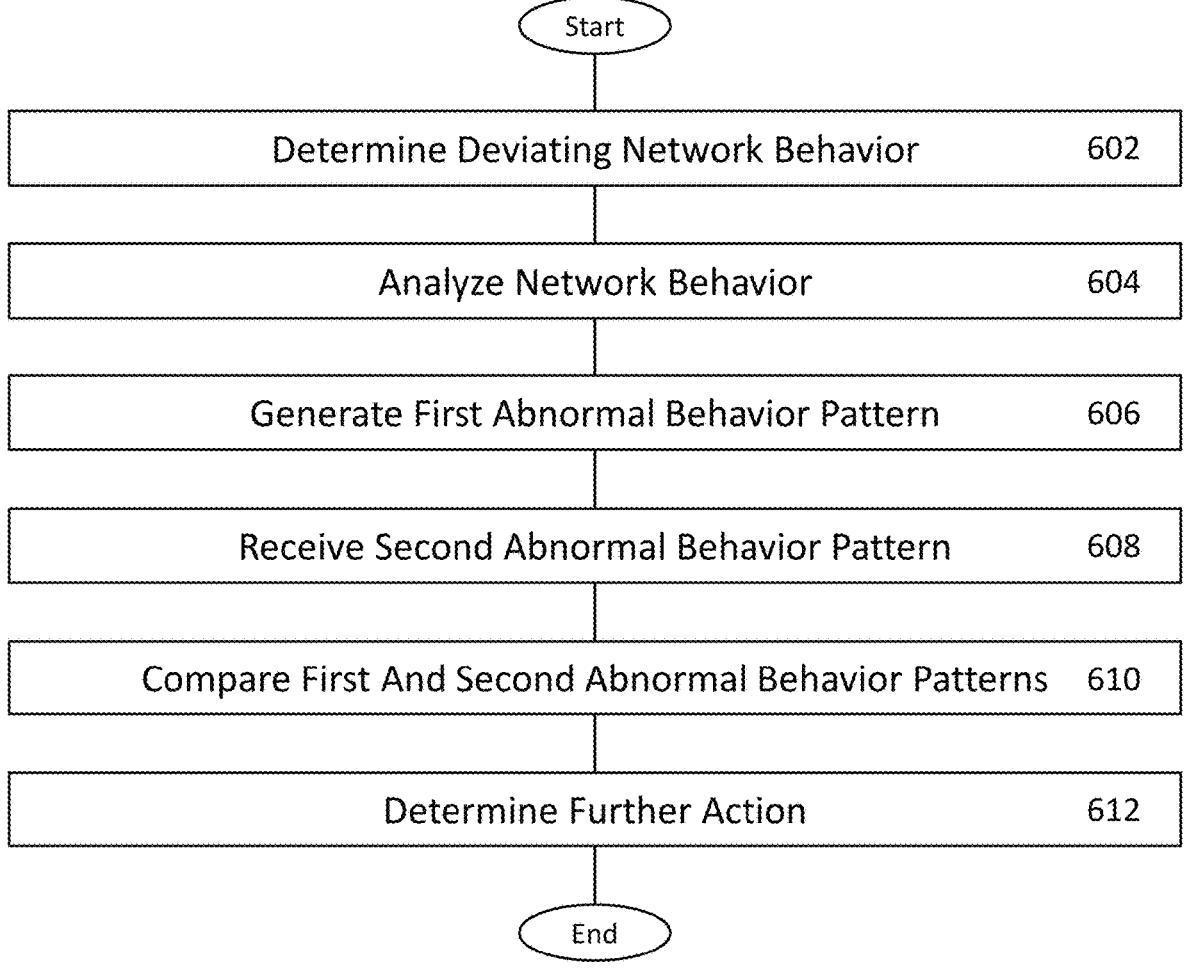
FIG. 6A illustrates a flowchart of an embodiment of a method for modeling human activity, machine activity, or other activity.

FIG. 6A illustrates a flowchart of an embodiment of a method for modeling human, machine or other activity. The cyber threat defense system receives a first abnormal behavior pattern. The first abnormal behavior pattern represents behavior on a first network deviating from a normal benign behavior of that network. The abnormal behavior pattern is an encoding of metadata describing the behavior that deviates from the normal benign behavior of the network and/or how the behavior deviates from the normal benign behavior.

Receiving the first abnormal behavior pattern comprises comparing input data monitoring the first network to at least one machine-learning model trained on a normal benign behavior of the first network using a normal behavior benchmark describing parameters corresponding to a normal pattern of activity of the first network to determine that a network behavior of the first network deviates from the normal benign behavior of the first network (Block 602). It can be determined that a network behavior deviates from the normal behavior of the network by comparing the currently monitored network behavior with the determined normal behavior, as discussed above.

The input data can come from sources that include, but are not limited to, raw network Internet Protocol (IP) traffic captured from an IP or other network Test Access Points (TAP) or Switched Port Analyzer (SPAN) port; machine generated log files; building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, the cyber threat defense system commonly obtains multiple metrics relating to a wide range of potential threats. Communications from components in the network contacting known suspect domains.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors are discrete mathematical models that implement a specific mathematical method against different sets of variables with the target network, and carry out analysis of the derived metrics. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

The analysis performed by the detectors on the metrics then outputs data in a form suitable for use with the model of normal behavior. As will be seen, the data is in a form suitable for comparing with the model of normal behavior and for updating the model of normal behavior. The system uses machine-learning or Artificial Intelligence to understand what is normal inside a company's network, and when something is not normal.

When the cyber threat defense system determines that unusual behavior has occurred, it then analyzes the network behavior deviating from the normal data to extract metadata that describes how the network behavior deviates from the normal benign behavior of the network (Block 604). In general, the metadata can be of the same types and from the same sources as the input data described above. However, it is preferable the set of metadata describes how the anomalous behavior deviates from the normal behavior such that it is characteristic of the abnormal behavior. The first metadata may be extracted from the input data or it may be obtained in addition to the input data in response to determining that abnormal behavior is occurring on the network. Based on the first metadata, the first abnormal behavior pattern is generated (Block 606).

A second abnormal behavior pattern is received (Block 608). Like the first abnormal behavior pattern, the second abnormal behavior pattern represents behavior on a network deviating from a normal benign behavior of that network. The network in this case may be the same network that the first abnormal behavior relates to or a different network. In addition, the second abnormal behavior pattern may relate behavior at a different time to the first abnormal behavior pattern. By way of an example, the second abnormal behavior pattern could relate to behavior on the same network as the first abnormal behavior pattern but at an earlier or a later time than the behavior to which the first abnormal behavior pattern relates occurred.

In general, when the cyber threat defense system is implementing the method, the second abnormal behavior pattern may be obtained from a computer storage component, such as a local memory or external or cloud-based database. Each time the method is applied and an abnormal behavior pattern is generated, this abnormal behavior pattern can then be stored for future use as the "second abnormal behavior pattern" in a subsequent implementation of the method. Hence, it will be appreciated that the second abnormal behavior pattern may ultimately have been created in the manner described above for the first abnormal behavior pattern.

The cyber threat defense system compares the first and second abnormal behavior patterns. (Block 610). The comparing is performed to determine whether the first abnormal behavior pattern and the second abnormal behavior pattern correspond to behavior of the same actor, who may be a malicious threat actor. It is performed by looking for a similarity between the behavior patterns, rather than by looking for an exact match, and hence utilizes a form of fuzzy matching to determine a degree of similarity—for example, using a neural net.

A specific threat actor X may have identifying hallmarks, such as coding in a particular language, reuse of certain code routines, particular network infiltration methodology and so forth. These indicators, which will form part of the abnormal behavior patterns, can collectively identify anomalous behavior as being the result of the specific threat actor X.

Known threat actors will have a stored abnormal behavior pattern, which essential acts like a profile for that threat actor, based on previous attacks and compromises. This can be intelligently expanded to encompass previously unknown compromises from the same actor where the artificial intelligence inside the cyber security appliance will see a similar, though not identical, anomalous behavior pattern of model breaches and indicators. These anomalies will not necessarily produce high profile model breaches by themselves. However, if determined to be sufficiently similar to an anomalous behavior pattern of a known threat actor, it can be determined that the anomalous behavior detected on the network represents malicious behavior and the appropriate remediation actions can then be triggered, including a further analysis (by AI or human), monitoring, and reporting for the suspected threat actor attack. It is noted that this can be the case even when the purpose or ultimate goal of the abnormal behavior is not clear (i.e., it is not known to what end the threat actor is working), because it can still be determined that a malicious party is behind the behavior.

The specific set of behavior patterns and indicators associated with a specific threat actor will differ from a traditional virus signature in cyber security. Unlike the virus signature which attacks the same way and appears the same in attack after attack, each new attack from a specific threat actor will vary naturally from the last attack. However, enough specific behavior patterns, hallmarks, and indicators, including endpoints, associated with a specific threat actor can be used to identify the source of the attack. In a similar way, an avid reader of books can identify favorite authors by their style and hallmark traits even though each novel can be on different subject matters and/or composed with different characters.

Thus, from known compromise instances from each specific threat actor, the artificial intelligence can ingest hallmarks of the series of attacks and established patterns of behavior including malicious endpoints, such as country, IP addresses, and other endpoint information, seen in these activities from that threat actor and build a behavioral profile to understand the behavior for each of those threat actors. This system can be augmented by human analysts investigate these incidents and threat actors and then performing analysis to come back with information about the threat actors, and feeding the human analyst information back into the profile being developed by the artificial intelligence learning. In this way, the system can make use of a form of supervised machine learning in that the system requires an initial determination by a human as to a threat actor by a specific behavior pattern.

Alternatively, the second abnormal behavior pattern may not correspond to a known threat actor. For example, the second abnormal behavior pattern may simply correspond to a previously detected pattern of abnormal behavior, but the party responsible, and possibly the intent behind the behavior, may be unknown. Nevertheless, in this case if the first abnormal behavior pattern (being representative of behavior currently happening or recently monitored on a network) is sufficiently similar to the second abnormal behavior pattern, it can be determined that the same party is responsible for both sets of anomalous behavior. From this it can be deduced that the behavior is likely malicious due to the repeated detection of the anomalous behavior having characteristics of the same source. In this case, as when the first anomalous behavior pattern is found to be sufficiently similar to an anomalous behavior pattern representative of a known threat actor, appropriate actions can be taken in response.

In both cases, the cyber threat defense system determines, based on the determination of potentially malicious behavior, as to whether further action need be taken regarding the threat (Block 610). A human operator may make this determination, or, alternatively, an algorithm may make this determination. The determination may be based, in part, on the level of similarity between the first abnormal behavior pattern and the second abnormal behavior pattern and on whether the second abnormal behavior pattern corresponds to a known threat actor (and if so, who that known threat actor is) or not.

Figure 6B:
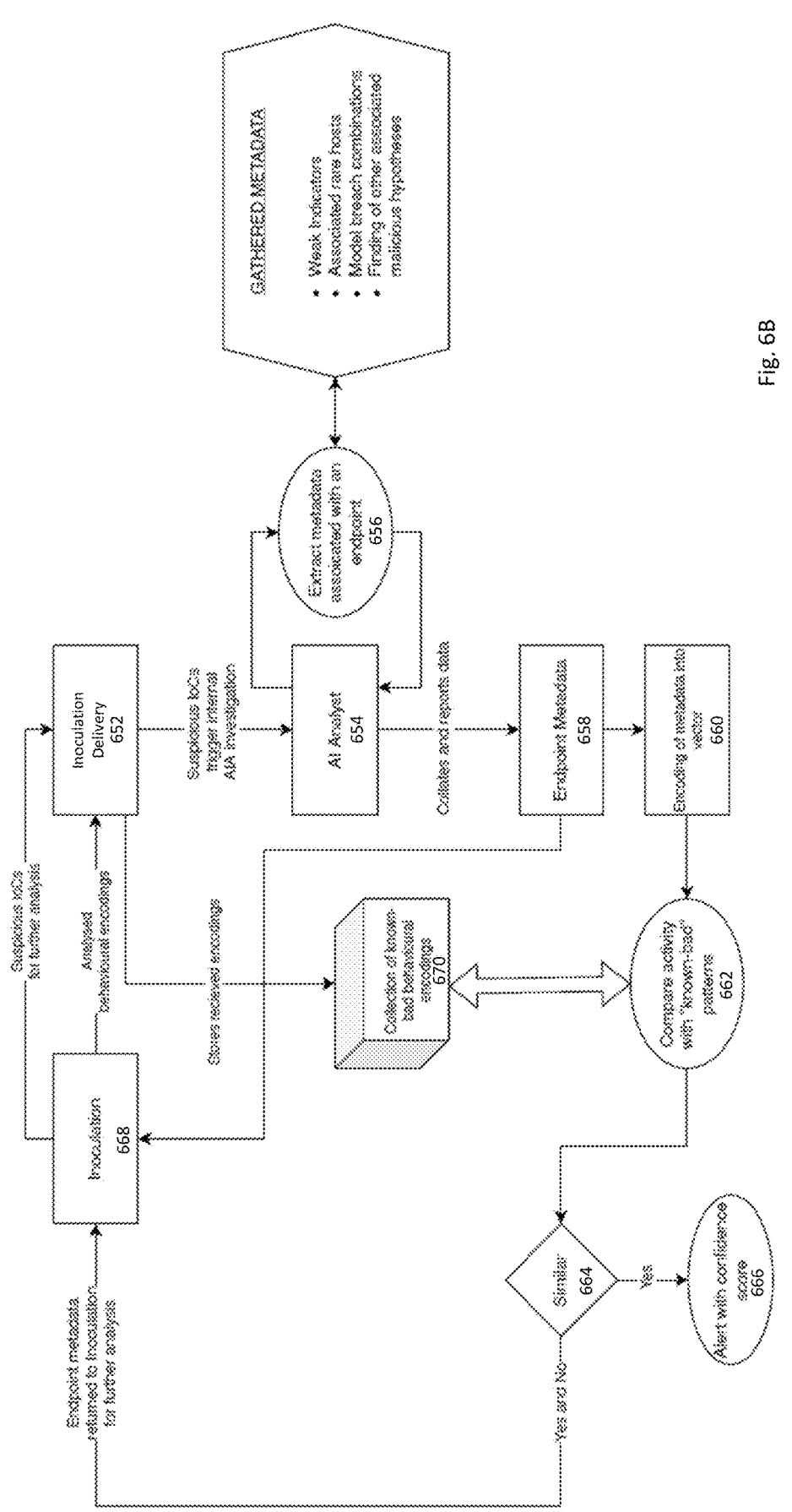
FIG. 6B illustrates in a block diagram an embodiment of a cyber threat defense system.

FIG. 6B is a complementary diagram showing further relationships within the cyber threat defense system, in particular illustrating how the outputs can be fed back into the system to continually update the cyber threat defense system to provide continued protection against emerging cyber threats.

Patterns of behavior that deviate from the normal benign behavior of the network, also termed indicators of compromise (IoCs), can be detected (Block 652) and sent to an AI Analyst program for further review (Block 654). It is here that the additional metadata is collected (Block 656) which may, for example, comprise endpoint metadata associated with the anomalous behavior. Such metadata defining the suspicious behavior can be sent to an inoculation module (Block 658), particularly if any of the individual metadata extracted are deemed to be a good indicator of compromise. Otherwise, the metadata characteristic of the anomalous behavior is encoded into a first abnormal behavior pattern (Block 660). Generally, this encoding may take the form of a number, a vector, or a matrix of two or more dimensions. The form of the encoding used may depend on the type of metadata to be encoded.

A second abnormal behavior pattern is received from a storage module containing a collection of abnormal behavior patterns corresponding to either known threats or that have previously been detected on this network or other networks monitored by the cyber security defense system (Block 670). The first abnormal behavior pattern is compared to the second abnormal behavior pattern (Block 662) to determine a degree of similarity (Block 664). As previously noted, this may, for example, be performed using a neural net to determine whether the two patterns of behavior are similar such that the indicate they are the result of the same actor. An exact match between the behavior patterns is not required.

If the comparison indicates that the first and second abnormal behavior patterns are sufficiently similar (e.g., a determined similarity value is above a threshold value), an alert can be generated which may include a confidence score (Block 666). This may be provided to a user of the cyber threat defense system, or may be provided to a part of the system that is configured to initiate an automatic response to detected cyber threats.

In addition, when the comparison indicates that the first and second abnormal behavior patterns are sufficiently similar, or indeed when the first and second abnormal behavior patterns are not similar, this information can be fed back into the inoculation module (Block 668) which can incorporate this information into one or more inoculation records that can then be distributed to the system.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprise a data structure that decides on a rolling continuum rather than a stepwise method in which recurring time cycles, such as the working day, shift patterns, and other routines are dynamically assigned, thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Inoculations

Figure 7:
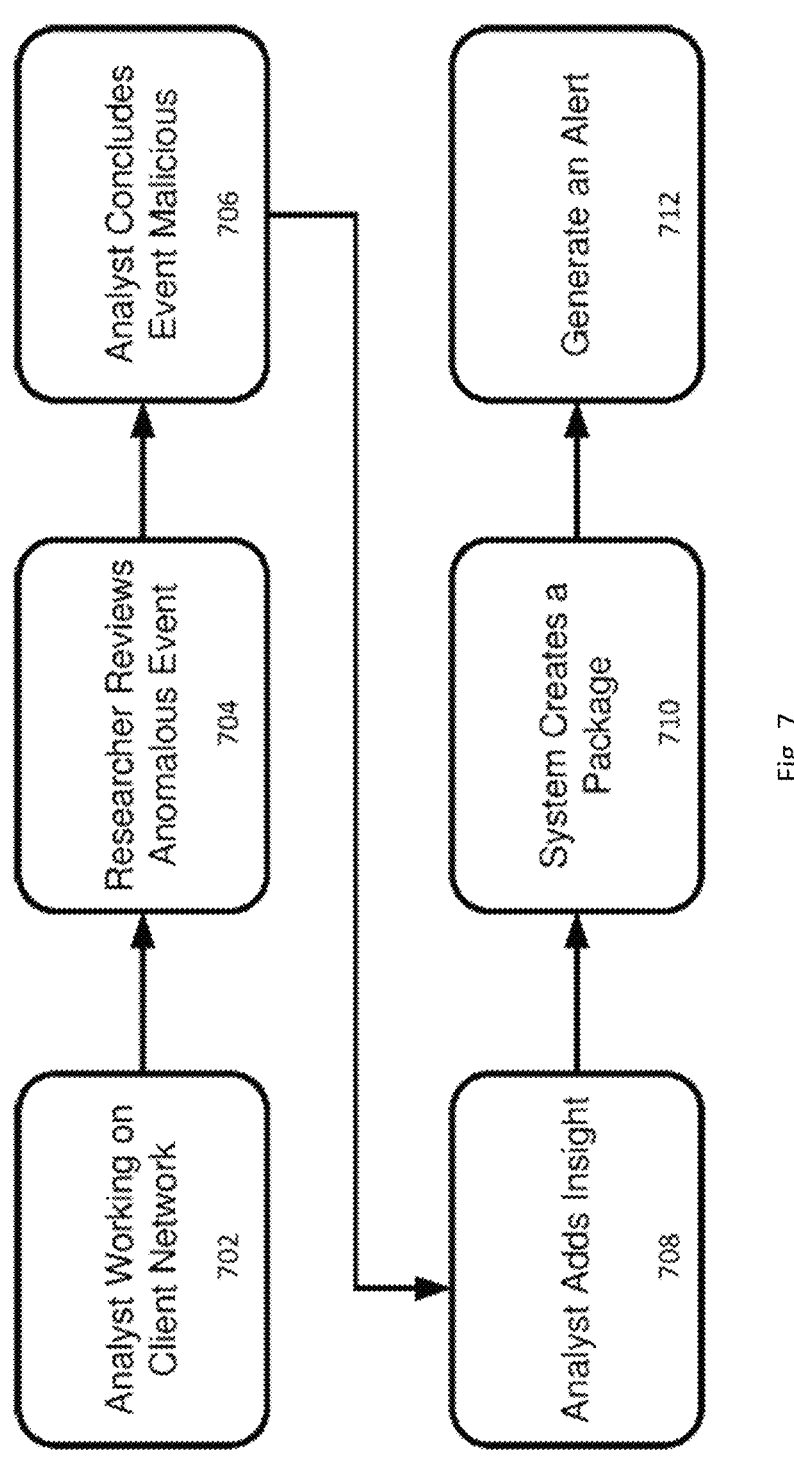
FIG. 7 illustrates an inoculation component of the cyber threat defense system.

The cyber threat defense system can leverage the identified anomalous events to strengthen defenses within the network and at affiliated networks. FIG. 7 illustrates an inoculation component of the cyber threat defense system. An analyst using the cyber threat defense system can discover signs of an in-progress attack in a digital network of an organization (Block 702). The analyst may be a human expert or may be an analyst program that uses machine-learning to identify an anomalous event, resulting in a totally automated end-to-end attack detection, inoculation distribution, and autonomous defense implementation.

The analyst may observe hallmarks of a digital attack in an anomalous event, referred to as an "Behavioral Indicators of Compromise" (b-IoCs), such as the abnormal behavior patterns described above. These hallmarks describe general patterns of anomalous behavior derived from network activity and constitute network artefacts such as, for example, a beaconing frequency score, a size of file that has a greater than and less than parameters, the length of time that has occurred between cyber threat alerts that are indicative of the malicious activity. Note, b-IOCs should be considered distinct from standard "Indicators of Compromise" which comprise inflexible, fixed values such as, for example, hashes, subdomains, domains, URLs and URIs. The analyst may use a researcher module operating an artificial intelligence (AI) algorithm to collect outside data about the anomalous event.

The researcher module can assess whether the b-IoC has previously appeared in other published threat research or known lists of malicious files or internet addresses (Block 704). This includes looking at a similarity between a first abnormal behavior pattern, representative of a behavior currently or recently detected on a network, and a second abnormal behavior pattern representing a previously detected abnormal behavior, and possibly associated with a known threat actor. The analyst can review the outside data alongside the observed behavior of the attack. The analyst may then conclude that the attack is both novel and malicious (706) by comparing the first and second abnormal behavior patterns in the manner described with respect to FIGS. 6A and 6B.

The analyst documents their findings and adds explanatory notes regarding the digital hallmarks of the malicious action (Block 708). Additionally, the analyst adds in any recommendations of an appropriate response that an autonomous defense system may select in the event of such an attack. For example, the autonomous defense system can prevent an infected device from speaking back to an attacker's control systems. Additionally, the autonomous defense system can interrupt any unusual file uploads going outside of the organization from the infected device.

The cyber threat defense system can create an inoculation package of the digital hallmarks, suggested autonomous responses, and documentation (Block 710). The cyber threat defense system can automatically disseminate this inoculation package to any other subscriber organization as an inoculation notice. Alternately, the cyber threat defense system can store the inoculation package as an inoculation record in a network-accessible inoculation database for future retrieval.

If the attack is already inside another organization or begins to try to get a foothold in an organization, that organization can compare its network behavioral information to those detailed in the inoculation package to identify shared behavioral indicators of compromise. The affiliated subscriber organization may generate an alert on that organization's security dashboard detailing the nature of the attack, along with supporting notes (Block 712). A human analyst from that organization may then investigate and respond.

If the organization has also deployed autonomous defenses, then that autonomous defense system can review the suggested response actions detailed in the inoculation package and select the most appropriate actions to take in the current situation. Typically, the autonomous defense system will start with a minimum level of disruption, aiming to surgically stop the attack without affecting normal organizational activity. If the attack changes in nature or becomes more aggressive, then the autonomous defense system can select more severe controls to apply to the infected device or devices. These actions could escalate up to removing internet access or even total network access.

In an embodiment, a mimetics system is configured to create and share digital antibodies for previously unknown cyber threats across different users' platforms. The mimetic system can share an inoculation package having digital antibodies with an autonomous response. The mimetics system and communication mechanism are configured to share a brand-new digital antibody against an unknown threat. When the mimetics system identifies an attack that no one has seen before, then the cyber threat defense system can use the intelligence models to determine what the appropriate autonomous response to this new unknown threat should be. Next, the mimetics system can encapsulate the identity of the threat, the characteristics to identify that threat, and the autonomous response to defend the network against this threat into a new digital antibody. The digital antibody can be shared or communicated and conveyed to the community at large or just to a selected segment of community, such as entities in that sector or subdivisions within the organization.

Figure 8:
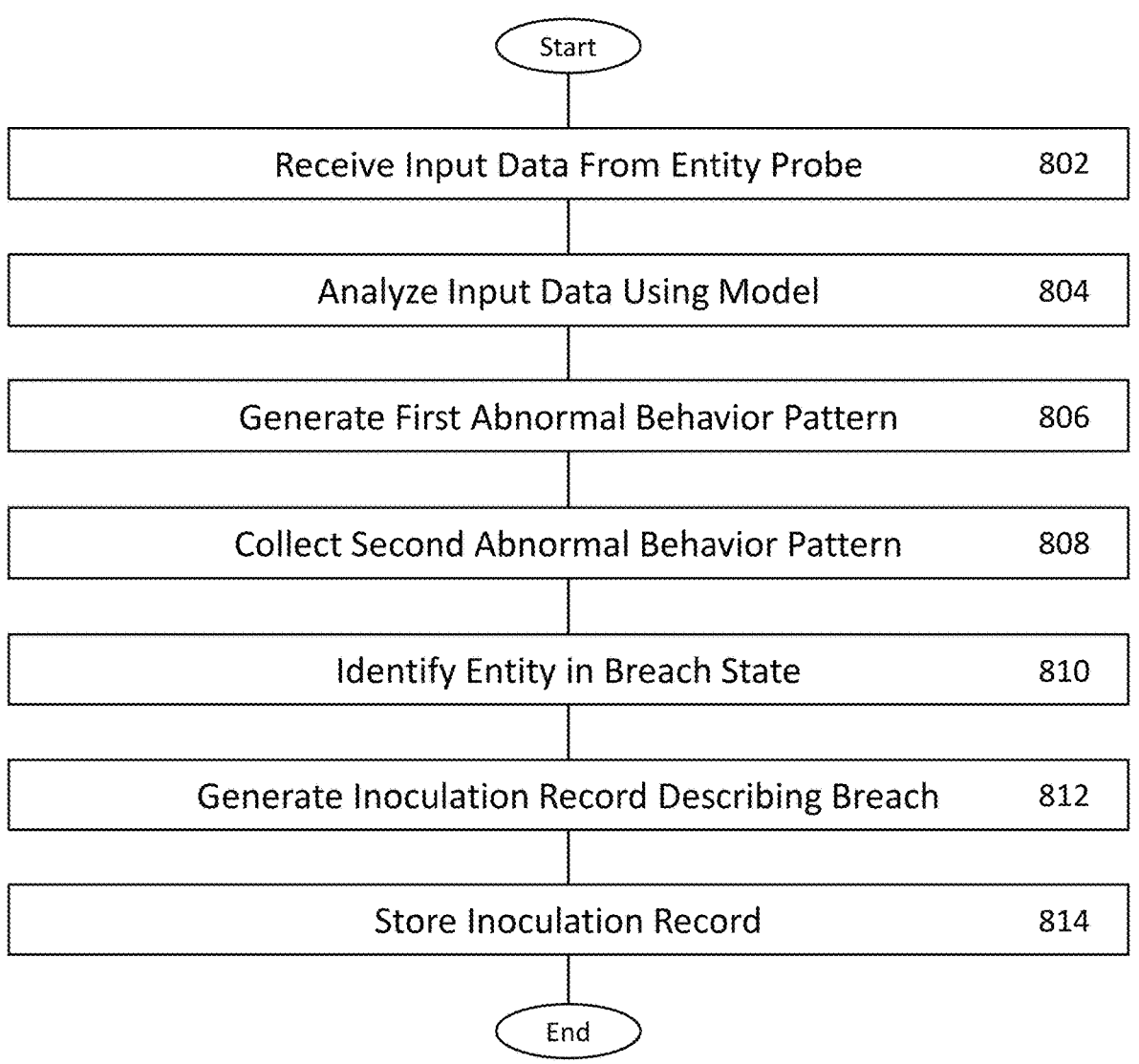
FIG. 8 illustrates a flowchart of an embodiment of a method for developing an inoculation record based on the detection of anomalous behavior.

FIG. 8 illustrates a flowchart of an embodiment of a method for developing an inoculation record based on the detection of an anomalous event. The cyber threat defense system can receive, via at least one input port, input data from a probe monitoring a network entity on a network (Block 802). The network entity can represent at least one of a user and a device associated with a network. The cyber threat defense system has a cyber threat module configured to analyze the input data using at least one machine-learning model to spot behavior on the network deviating from a normal benign behavior of that network entity (Block 804). The at least one machine-learning model is trained on generic normal benign behavior of a generic network entity using a normal behavior benchmark describing parameters corresponding to a normal pattern of activity for that network entity. The cyber threat defense system has a comparison module that compares the input data to the at least one machine-learning model to spot behavior on the network deviating from a normal benign behavior of that network entity and generate a corresponding first abnormal behavior pattern (Block 806). The cyber threat defense system has a researcher module configured to collect a second abnormal behavior pattern (Block 808). The comparison module can identify whether the first and second abnormal behavior patterns are similar and that the network entity is hence in a breach state (Block 810). The cyber threat module can identify whether the breach state and a chain of relevant behavioral parameters deviating from the normal benign behavior of that network entity correspond to a cyber threat (Block 812). The cyber threat defense system has an inoculation module configured to generate an inoculation pattern describing the breach state and the chain of relevant behavioral parameters corresponding to the cyber threat identified by the cyber threat module (Block 814). The inoculation pattern abstracts the incident data of the cyber threat to more clearly identify the relevant features of the cyber threat. The inoculation module can store the inoculation pattern in an inoculation record in a network-accessible inoculation database in the data store (Block 816).

Figure 9:
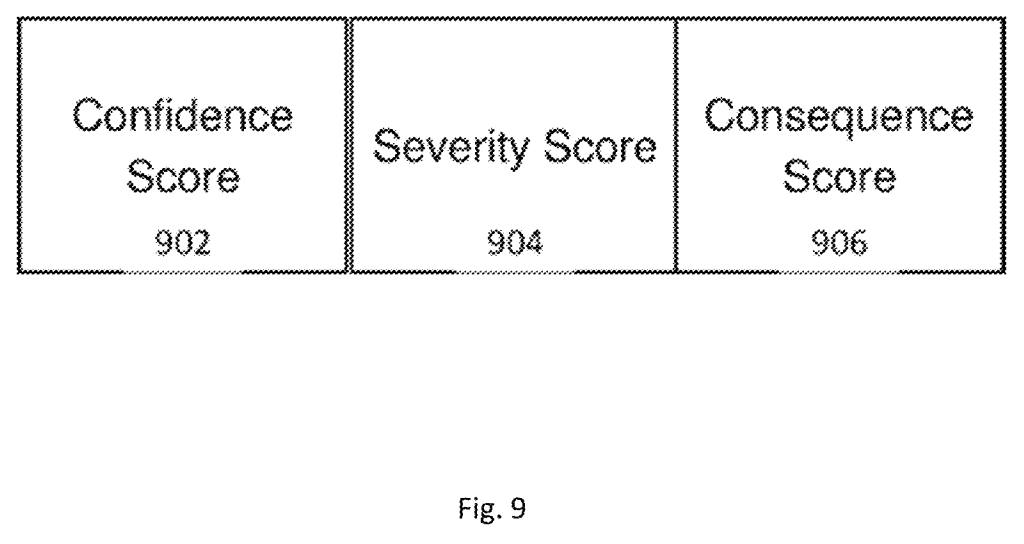

The cyber threat defense system can generate a threat risk parameter to describe the relative dangers of a cyber threat. FIG. 9 illustrates a block diagram of a threat risk parameter. The threat risk parameter can have a confidence score 902 indicating a threat likelihood describing a probability that the breach state is a cyber threat. The threat risk parameter can have a severity score 904 indicating a percentage that the network entity in the breach state is deviating from normal behavior, as represented by the at least one model. The threat risk parameter can have a consequence score 906 indicating a severity of damage attributable to the cyber threat.

Figure 10:
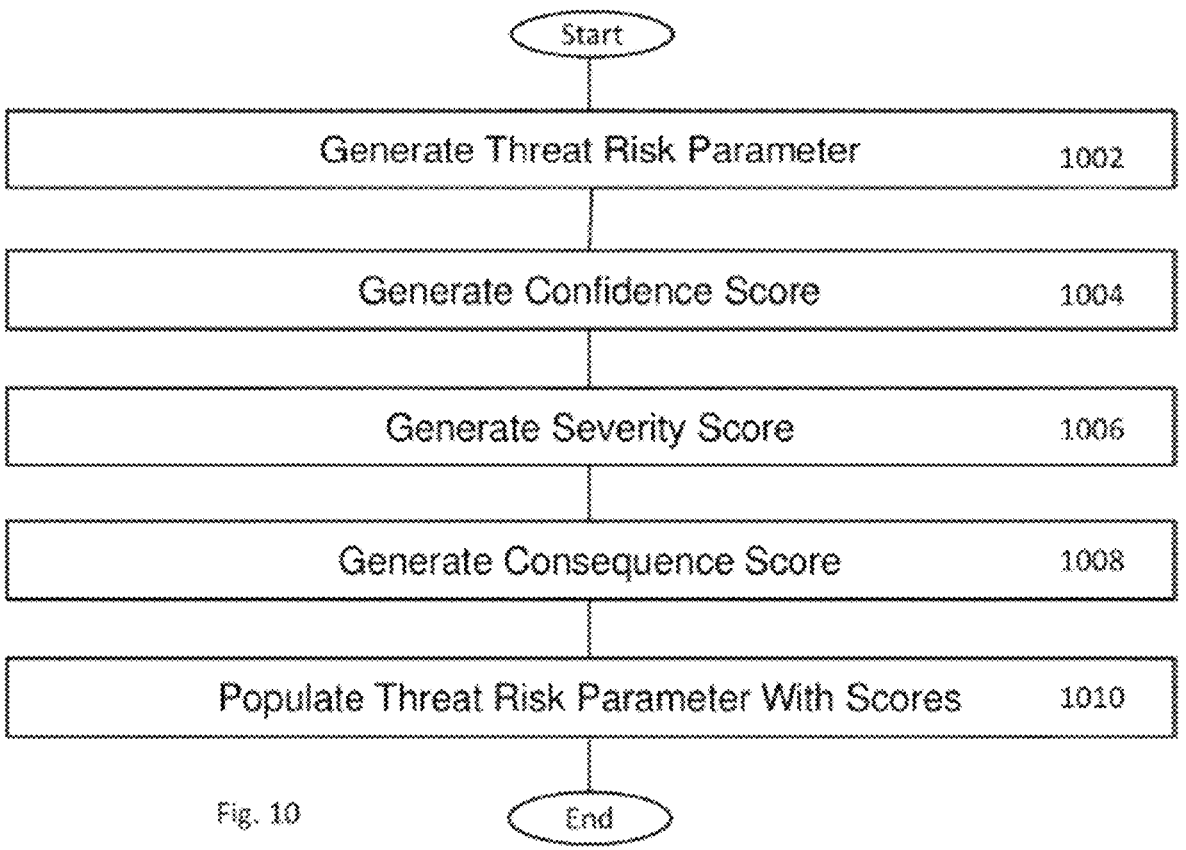
FIG. 10 illustrates a flowchart of an embodiment of a method for generating a threat risk parameter.

FIG. 10 illustrates a flowchart of an embodiment of a method for generating a threat risk parameter. The cyber threat module can generate a threat risk parameter listing a set of values describing aspects of the breach state (Block 1002). The cyber threat module can generate a confidence score (Block 1004). The cyber threat module can generate a severity score (Block 1006). The cyber threat module can generate a consequence score (Block 1008). The cyber threat module can populate the threat risk parameter with at least one of the confidence score, the severity score, and the consequence score (Block 1010).

The cyber threat defense system can store information describing the identified cyber threats in an inoculation record. FIG. 11 illustrates a block diagram of an inoculation record. The inoculation record can have a random number to act as a threat identifier 1102. The threat identifier 1102 may be disassociated from the network entity to protect personally identifiable information. The actual identity of the network entity can be obfuscated or anonymized to remove any personally identifiable information for the network entity. The inoculation record has an inoculation pattern 1104 describing the breach state and the chain of relevant behavioral parameters corresponding to the cyber threat identified by the cyber threat module. The inoculation record has a threat risk parameter 1106 listing a set of values describing aspects of the breach state. The inoculation record has a context data set 1108 provided by the user analyst describing at least one of a network entity action and a network entity state related to the cyber threat to provide context for the actions and states of the network entity during the breach state. The inoculation record has an outside data set 1110 that may be collected from at least one data source outside the network describing at least a second abnormal behavior pattern. The inoculation record has a remediation action instruction 1112 to describe at least one action to remediate the cyber threat.

Figure 12:
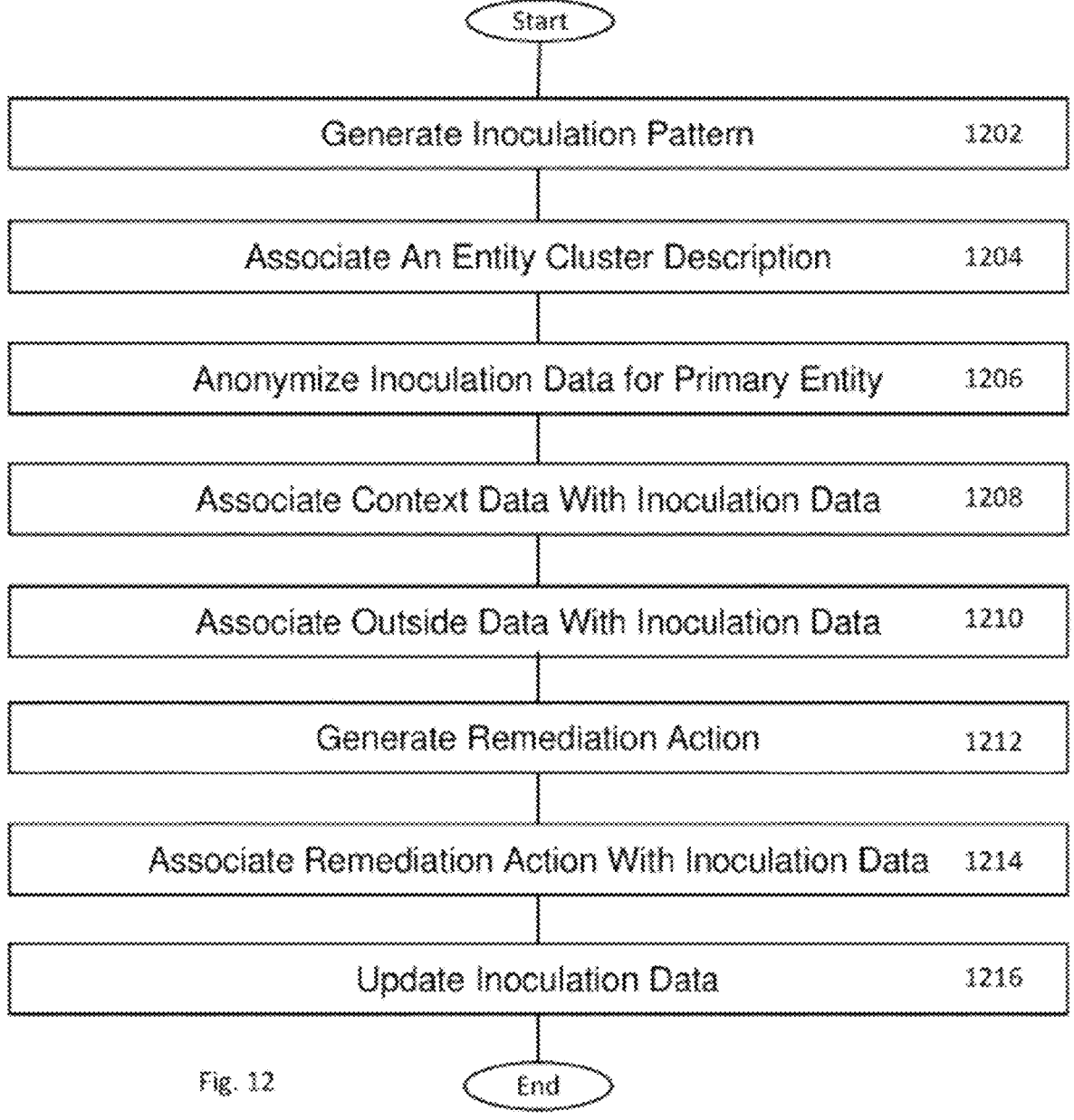
FIG. 12 illustrates a flowchart of an embodiment of a method for generating an inoculation record.

FIG. 12 illustrates a flowchart of an embodiment of a method for generating an inoculation record. The cyber threat module can generate an inoculation pattern describing the breach state and the chain of relevant behavioral parameters corresponding to the cyber threat identified by the cyber threat module (Block 1202). The inoculation record can associate the inoculation pattern with a random number acting as a threat identifier (Block 1204). The inoculation module can anonymize the incident data in creating an inoculation pattern to remove any personally identifiable information for the network entity from the inoculation pattern (Block 1206). The inoculation record associates the inoculation pattern with a context data set describing at least one of a network entity action and a network entity state related to the cyber threat provided by a user analyst (Block 1208). The inoculation record associates the inoculation pattern with an outside data set collected from at least one data source outside the network describing at least one of an outside action and an outside state related to the cyber threat (Block 1210). The inoculation module can generate a remediation action instruction to describe at least one action to remediate the cyber threat (Block 1212). The inoculation record associates the inoculation pattern with the remediation action instruction (Block 1214). The inoculation module is configured to update the inoculation pattern in the inoculation record based on a subsequent event at the network entity or a target device (Block 1216).

Figure 13:
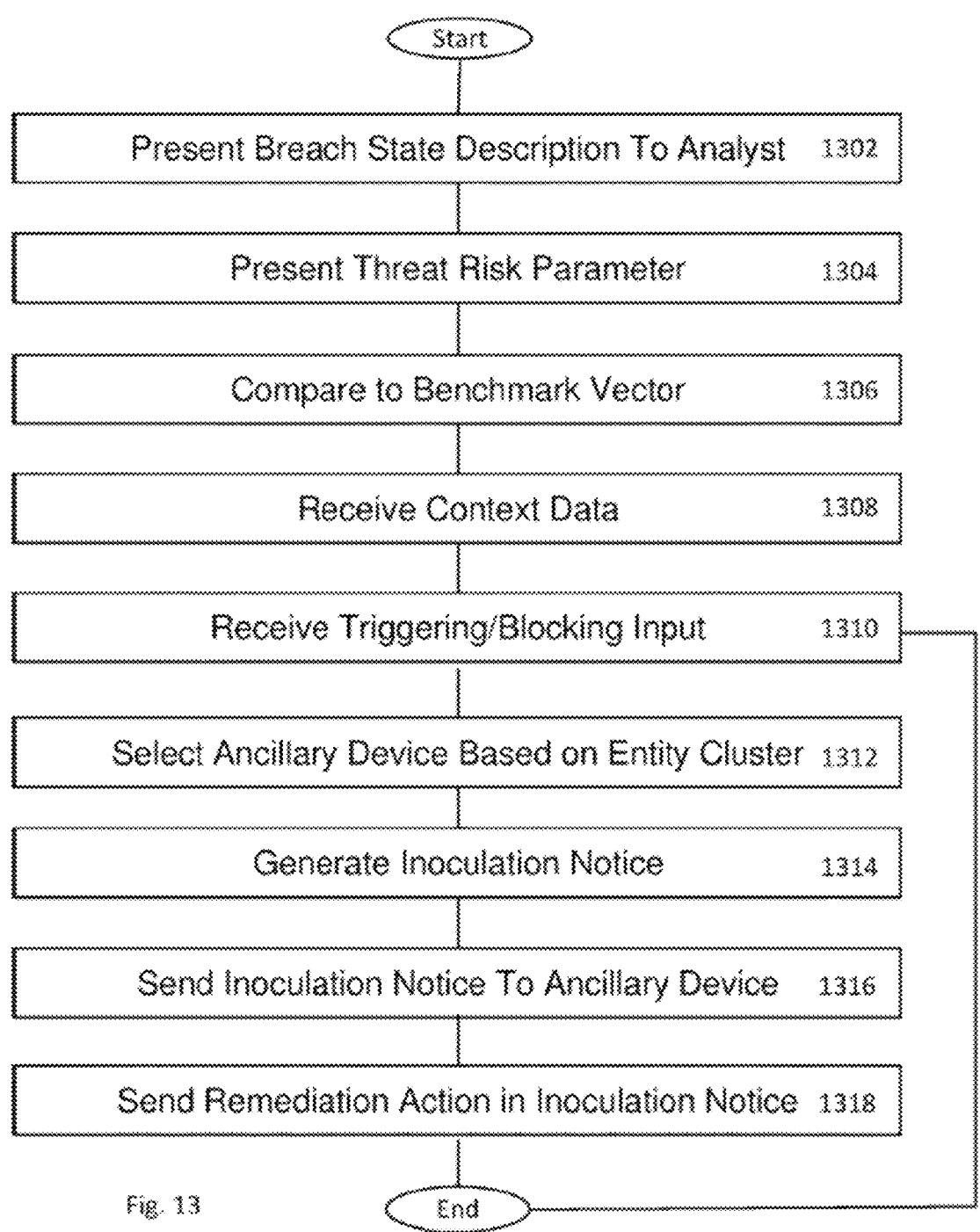
FIG. 13 illustrates a flowchart of an embodiment of a method for sending an inoculation notice.

The cyber threat defense system may allow the user analyst to send an inoculation notification. FIG. 13 illustrates a flowchart of an embodiment of a method for sending an inoculation notice. The user interface module can present a description of the breach state to a user analyst for review (Block 1302). The user interface module can present the threat risk parameter listing a set of values describing aspects of the cyber threat to the user analyst (Block 1304). The inoculation module can compare the threat risk parameter to a benchmark vector describing various thresholds for normal behavior (Block 1306). The user interface module may receive, from the user analyst, a context data set describing at least one of a network entity action and a network entity state related to the cyber threat (Block 1308). The user interface module can receive at least one of a triggering input and a blocking input from a user analyst (Block 1310). The triggering input directs transmission of the inoculation notice to the target device. The blocking input prevents transmission of the inoculation notice to the target device.

The inoculation module is configured to create an entity cluster to group the network entity with other entities of the network based on the chain of relevant behavior parameters of the inoculation pattern (Block 1312). To be able to properly identify a target device that may benefit from inoculation, a cyber threat defense system may identify other similar devices on the network. To accomplish this, the cyber threat defense system can leverage the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods, such as matrix-based clustering, density-based clustering, and hierarchical clustering techniques. An inoculation module may use the resulting clusters to identify individual devices that may benefit from the clustering. The inoculation module is configured to select a target device for notification regarding the inoculation pattern based on the entity cluster (Block 1314).

The inoculation module is configured to generate an inoculation notice having the inoculation pattern describing the breach state and the chain of relevant behavioral parameters to warn of a potential cyber threat (Block 1316). The inoculation module is configured to use the communication module to send the inoculation notice to a target device to warn of a potential cyber threat by the target device (Block 1318). The inoculation module is configured to send a remediation action instruction in the inoculation notice to describe at least one action to remediate the cyber threat (Block 1320).

The cyber threat defense system can use a benchmark to determine whether a user or device is in a breach state. The cyber threat defense system can also use a similar benchmark to automatically determine whether to send an inoculation notice without user analyst input. The cyber threat defense system can present the benchmark to the user analyst to provide context for the threat risk parameter. Alternately, the cyber threat defense system can use the benchmark to automatically determine whether to send an inoculation notice. The inoculation module may use a benchmark matrix representing a varied set of benchmarks to consider a variety of factors when determining whether to send an inoculation notice.

FIG. 14 illustrates a block diagram of a benchmark matrix. The inoculation module, in conjunction with the cyber threat module, can populate the benchmark matrix with moving benchmarks that can adapt to the changing nature of both the network and threats to the network. The benchmark matrix can have a confidence benchmark 1402 indicating a threat likelihood describing a probability that the breach state is the cyber threat. The benchmark matrix can have a severity benchmark 1404 indicating a percentage above which the network entity is in the breach state. The benchmark matrix can have a consequence benchmark 1406 indicating a severity of damage attributable to the cyber threat that above which immediate action is to be taken. The inoculation module can adjust these benchmarks as more data is added and greater user input is received.

The inoculation module can assign a weight to each benchmark score to assign a relative importance to each benchmark score to factor in a decision to send an inoculation notice. As with the benchmarks, these weights may evolve over time. For example, the benchmark matrix can have a confidence weight 1408 indicating the importance of the confidence benchmark, a severity weight 1410 indicating the importance of the severity benchmark, and a consequence weight 1412 indicating the importance of the consequence benchmark. Using these assigned weights, different deviations from the benchmarks may have a greater result on the final decision to send and inoculation notice.

Figure 15:
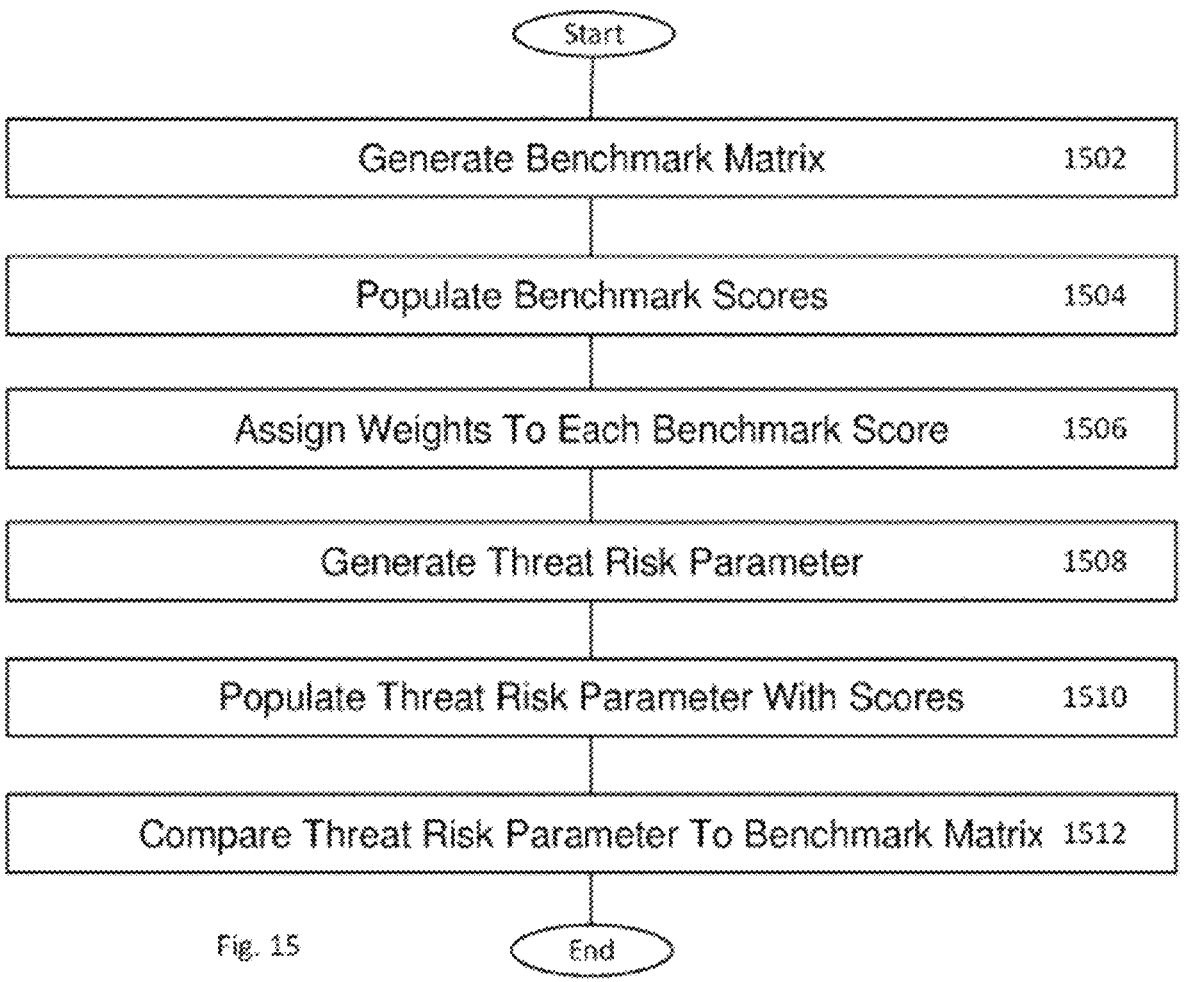
FIG. 15 illustrates a flowchart of an embodiment of a method for comparing analyzed input data to a benchmark to trigger a notice.

FIG. 15 illustrates a flowchart of an embodiment of a method for comparing analyzed input data to a benchmark to trigger an inoculation notice. The inoculation module can generate a benchmark matrix having a set of benchmark scores to determine whether to send the inoculation notice (Block 1502). The inoculation module can populate the benchmark scores in the benchmark matrix based on data gathered during the breach identification and inoculation process (Block 1504). The inoculation module can assign a weight to each bench mark score to assign a relative importance to each benchmark score (Block 1506). The cyber threat module can generate a threat risk parameter listing a set of values describing aspects of the cyber threat (Block 1508). The cyber threat module can populate the threat risk parameter with at least one of a confidence score, a severity score, and a consequence score (Block 1510). The inoculation module can compare the threat risk parameter to the benchmark matrix to determine whether to send the inoculation notice (Block 1512).

Figure 16:
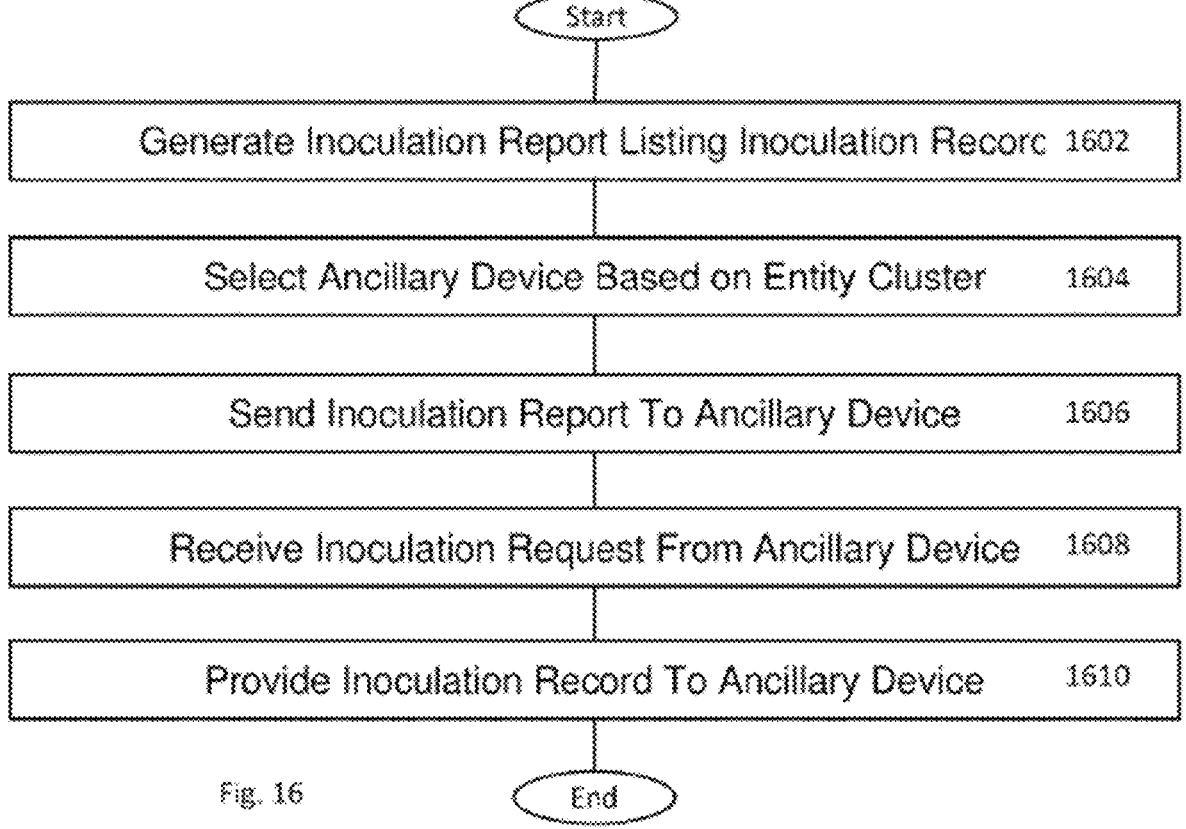
FIG. 16 illustrates a flowchart of an embodiment of a method for sending an inoculation report.

While generally the inoculation module sends the inoculation notice immediately, the inoculation module may store an inoculation record describing anomalous events for later retrieval by a target device. FIG. 16 illustrates a flowchart of an embodiment of a method for sending an inoculation report. The inoculation module is configured to generate an inoculation report listing at least the inoculation record (Block 1602). The inoculation module is configured to create an entity cluster to group the network entity with other entities of the network based on the chain of relevant behavior parameters of the inoculation pattern (Block 1604). The inoculation module is configured to select a target device to receive an inoculation report regarding the inoculation record based on the entity cluster (Block 1606). The inoculation module is configured to send the inoculation report to a target device related to the network entity to instruct the target device to retrieve the inoculation record from the network-accessible inoculation database (Block 1608). The inoculation module can receive an inoculation request for the inoculation record form the target device (Block 1610). The inoculation module may then provide the inoculation record to the target device (Block 1612).

Web Site

The web site is configured as a browser-based tool or direct cooperating app tool for configuring, analyzing, and communicating with the cyber threat defense system.

Network

A number of electronic systems and devices can communicate with each other in a network environment. FIG. 17 illustrates in a simplified diagram a networked environment. The network environment has a communications network. The network can include one or more networks selected from an optical network, a cellular network, the Internet, a Local Area Network ("LAN"), a Wide Area Network ("WAN"), a satellite network, a 3rd party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system in which may be able to exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) the request and response cycle from a dedicated on-line server, 3) the request and response cycle directly between a native application resident on a client device and the cloud-based remote access to another client computing system, and 4) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802 B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Also, multiple modules can be combined into a single module where logically possible.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A method for a cyber threat defense system, comprising:

using an inoculation module from a first cyber threat defense system protecting a first network to generate an inoculation notice having an inoculation pattern to warn about and supply one or more suggested remediation actions to take against a potential breach state of normal behavior representing a first abnormal behavior pattern, which corresponds to a cyber threat that could harm one or more target devices in a second network, where the inoculation module uses a communication module to send the inoculation notice to the one or more target devices on the second network protected by an affiliated cyber threat defense system via at least one output port;

receiving the first abnormal behavior pattern, the first abnormal behavior pattern representing behavior on the first network deviating from a normal benign behavior defined in relation to a first benign behavior benchmark of the first network;

receiving a second abnormal behavior pattern, the second abnormal behavior pattern representing behavior on the second network deviating from a normal benign behavior defined in relation to a second benign behavior benchmark of the second network;

comparing the first and second abnormal behavior patterns to determine a similarity score between the first and second abnormal behavior patterns;

determining, based on the comparison, that the first abnormal behavior pattern likely corresponds to malicious behavior when the similarity score is above a threshold;

using an autonomous response module in the cyber threat defense system, rather than a human taking an action, to cause one or more autonomous actions to be taken to contain the cyber threat corresponding to the malicious behavior when a threat risk parameter from a cyber threat module in the cyber threat defense system is equal to or above an actionable threshold, based upon the one or more suggested remediation actions contained in the inoculation notice; and using the cyber threat module's configured cooperation with the autonomous response module, to cause the one or more autonomous actions to be taken to contain the cyber threat, which improves computing devices in the first network by limiting an impact of the cyber threat from consuming unauthorized CPU cycles, memory space, and power consumption in the computing devices via responding to the cyber threat without waiting for some human intervention, wherein the autonomous response module initiates the one or more autonomous actions to surgically counteract malicious activity indicated by at least one of the first and the second abnormal behavior patterns, without disrupting normal network behavior.

2. The method of claim 1, wherein receiving the first abnormal behavior pattern comprises:

comparing input data monitoring the first network to at least one machine-learning model trained on a normal benign behavior of the first network using a normal behavior benchmark describing parameters corresponding to a normal pattern of activity of the first network to determine that a network behavior of the first network deviates from the normal benign behavior of the first network;

analyzing the network behavior of the first network to extract first metadata that describes how the network behavior of the first network deviates from the normal benign behavior of the first network; and generating the first abnormal behavior pattern using the first metadata.

3. The method of claim 2, wherein the first abnormal behavior pattern is generated by encoding the first metadata into a single value, a vector or a matrix.

4. The method of claim 1, wherein when the second abnormal behavior pattern represents behavior on the first network deviating from a normal benign behavior of that network, receiving the second abnormal behavior pattern comprises:

comparing input data monitoring the first network to at least one machine-learning model trained on a normal benign behavior of the first network using a normal behavior benchmark describing parameters corresponding to a normal pattern of activity of the first network to determine that a network behavior of the first network deviates from the normal benign behavior of the first network;

analyzing the network behavior of the first network to extract second metadata that describes how the network behavior of the first network deviates from the normal benign behavior of the first network; and generating the second abnormal behavior pattern using the second metadata.

5. The method of claim 4, wherein the second abnormal behavior pattern is generated by encoding the second metadata into a single value, a vector or a matrix.

6. The method of claim 1, wherein when the second abnormal behavior pattern represents behavior on the second network deviating from a normal benign behavior of that network, receiving the second abnormal behavior pattern comprises:

comparing input data monitoring the second network to at least one machine-learning model trained on a normal benign behavior of the second network using a normal behavior benchmark describing parameters corresponding to a normal pattern of activity of the second network to determine that a network behavior of the second network deviates from the normal benign behavior of the second network;

analyzing the network behavior of the second network to extract second metadata that describes how the network behavior of the second network deviates from the normal benign behavior of the second network; and generating the second abnormal behavior pattern using the second metadata.

7. The method of claim 1, wherein receiving the second abnormal behavior pattern comprises selecting one abnormal behavior pattern from a plurality of stored abnormal behavior patterns as the second abnormal behavior pattern.

8. The method of claim 7, wherein the method is repeated such that the first abnormal behavior pattern is compared against each of the stored abnormal behavior patterns.

9. The method of claim 8, wherein the method is repeated either until the first abnormal behavior pattern is found to have a similarity score above the threshold when compared with one of the stored abnormal behavior patterns or until the first abnormal behavior pattern is compared against each of the stored abnormal behavior patterns.

10. The method of claim 1, wherein the first abnormal behavior pattern is not known to correspond to malicious behavior and wherein the second abnormal behavior pattern corresponds to behavior of a known specific threat actor corresponding to the cyber threat.

11. The method of claim 10, wherein the second abnormal behavior pattern includes an encoding of metadata that enables the comparison with the first abnormal behavior pattern to identify that the first abnormal behavior corresponds to the specific threat actor but that does not necessarily identify a specific attack.

12. The method of claim 11, wherein receiving the second abnormal behavior pattern comprises providing known compromise instances from the specific threat actor to a neural network to determine the second abnormal behavior pattern corresponding to behavior of that specific threat actor.

13. The method of claim 12, wherein the method further comprises, if the similarity score between the first and second abnormal behavior patterns is above the threshold, updating, by the neural network, the second abnormal behavior pattern based on the first abnormal behavior pattern being determined behavior of the specific threat actor.

14. The method of claim 1, wherein the first abnormal behavior pattern and the second abnormal behavior pattern are not known to correspond to the malicious behavior.

15. The method of claim 14, wherein the first abnormal behavior pattern and the second abnormal behavior pattern have been compared to known patterns of malicious behavior and found not to match the known patterns of malicious behavior.

16. The method of claim 1, wherein when it is determined that the first abnormal behavior pattern likely corresponds to the malicious behavior, sending the inoculation notice having the inoculation pattern describing the first abnormal behavior pattern to the one or more target devices to warn of the potential cyber threat, where the inoculation notice is stored in a network-accessible inoculation database.

17. The method of claim 16, further comprising determining a first remediation action in response to the potential cyber threat, wherein the inoculation notice includes the first remediation action, where the inoculation module generates the inoculation notice containing incident data describing a breach state by a user or device, acting as a network entity, to warn other computing devices of the potential cyber threat as well as provide the first remediation action instruction to describe at least one action to remediate the breach state, and wherein the autonomous response module is configured to automatically generate the remediation action instruction from the inoculation notice when the cyber threat is determined to be similar to the potential cyber threat described in the inoculation notice based upon the first remediation action, where the inoculation notice includes an outside data set collected from at least one data source outside the first network describing at least one of an outside action and an outside state related to the cyber threat.

18. The method of claim 1, further comprising, when it is determined that the first abnormal behavior pattern likely corresponds to the malicious behavior, presenting a description of the first abnormal behavior pattern to a user analyst for review.

19. A non-transitory computer readable medium including executable instructions that, when executed with one or more processors, cause a cyber threat defense system to perform the method of claim 1.

20. A cyber threat defense system, comprising:

one or more processing components; and a non-transitory computer readable medium;

an inoculation module stored on the non-transitory computer readable medium configured in a first cyber threat defense system that protects a first network configured to generate an inoculation notice having an inoculation pattern to warn about and supply one or more suggested remediation actions to take against a potential breach state of normal behavior representing a first abnormal behavior pattern, which corresponds to a cyber threat that could harm one or more target devices in a second network, where the inoculation module is configured to use a communication module to send the inoculation notice to the one or more target devices on the second network protected by an affiliated cyber threat defense system via at least one output port;

where the one or more target devices in the second network are configured to receive the first abnormal behavior pattern, where the first abnormal behavior pattern represents behavior on the first network deviating from a normal benign behavior defined in relation to a first benign behavior benchmark of the first network;

where the one or more target devices in the second network are configured to receive a second abnormal behavior pattern, where the second abnormal behavior pattern representing behavior on the second network deviating from a normal benign behavior defined in relation to a second benign behavior benchmark of the second network;

where the affiliated cyber threat defense system is configured to compare the first and second abnormal behavior patterns to determine a similarity score between the first and second abnormal behavior patterns;

where the affiliated cyber threat defense system is configured to determine, based on the comparison, that the first abnormal behavior pattern likely corresponds to malicious behavior when the similarity score is above a threshold;

where the affiliated cyber threat defense system is configured to use an autonomous response module in the cyber threat defense system, rather than a human taking an action, to cause one or more autonomous actions to be taken to contain the cyber threat corresponding to the malicious behavior when a threat risk parameter from a cyber threat module in the cyber threat defense system is equal to or above an actionable threshold, based upon the one or more suggested remediation actions contained in the inoculation notice, and where the cyber threat module is configured to cooperate with the autonomous response module to cause the one or more autonomous actions to be taken to contain the cyber threat, which improves computing devices in the first network by limiting an impact of the cyber threat from consuming unauthorized CPU cycles, memory space, and power consumption in the computing devices via responding to the cyber threat without waiting for some human intervention, wherein the autonomous response module is configured to initiate the one or more autonomous actions to surgically counteract malicious activity indicated by at least one of the first and the second abnormal behavior patterns, without disrupting normal network behavior.

* * * * *